United States Patent
Herbst et al.

(10) Patent No.: US 8,196,237 B2
(45) Date of Patent: Jun. 12, 2012

(54) PATIENT SUPPORT BRAKE SYSTEM

(75) Inventors: Cory Herbst, Shelbyville, MI (US);
John Zerbel, Paw Paw, MI (US);
Eugene L. Keller, III, Portage, MI (US);
Mike Brubaker, Vicksburg, MI (US);
Douglas Keller, Kalamazoo, MI (US)

(73) Assignee: Stryker Corporation, Kalamazoo, MI (US)

( * ) Notice: Subject to any disclaimer, the term of this patent is extended or adjusted under 35 U.S.C. 154(b) by 397 days.

(21) Appl. No.: 12/470,155

(22) Filed: May 21, 2009

(65) Prior Publication Data

US 2009/0288254 A1 Nov. 26, 2009

Related U.S. Application Data

(60) Provisional application No. 61/055,669, filed on May 23, 2008.

(51) Int. Cl.
*A61G 1/02* (2006.01)
(52) U.S. Cl. .................................. 5/600; 5/611; 5/86.1
(58) Field of Classification Search ............. 5/611, 600, 5/86.1; 280/43.17, 98, 764.1, 767
See application file for complete search history.

(56) References Cited

U.S. PATENT DOCUMENTS

| | | |
|---|---|---|
| 1,630,514 A | 5/1927 | Bayer |
| 1,633,638 A | 6/1927 | Jarvis et al. |
| 1,671,774 A | 5/1928 | McIntosh |
| 1,731,312 A | 10/1929 | Matheson |
| 2,068,160 A | 1/1937 | Zeindler |
| 2,081,594 A | 3/1937 | McIntosh |
| 2,110,227 A | 3/1938 | Koenigkramer et al. |
| 2,951,258 A | 9/1960 | Brooks et al. |
| 2,972,163 A | 2/1961 | Ross et al. |
| 3,304,116 A | 2/1967 | Stryker |
| 3,828,392 A | 8/1974 | Bolger |
| 3,881,216 A | 5/1975 | Fontana |
| 3,890,669 A | 6/1975 | Reinhards |
| 3,974,542 A | 8/1976 | Timmer et al. |
| 4,028,773 A | 6/1977 | Morgan |
| 4,035,864 A | 7/1977 | Schroder |
| 4,175,783 A | 11/1979 | Pioth |
| 4,205,413 A | 6/1980 | Collignon et al. |
| 4,276,962 A | 7/1981 | Aulik |
| 4,309,791 A | 1/1982 | Aulik |
| 4,333,207 A | 6/1982 | Atwood |
| 4,349,937 A | 9/1982 | Fontana |
| 4,349,938 A | 9/1982 | Fontana |
| 4,449,268 A | 5/1984 | Schnuell |
| 4,669,580 A | 6/1987 | Neville |

(Continued)

*Primary Examiner* — Fredrick Conley
(74) *Attorney, Agent, or Firm* — Warner Norcross & Judd LLP

(57) ABSTRACT

A movable patient support includes a frame, a patient support surface supported at the frame, a base supporting the frame and having a plurality of bearing assemblies for moving the base along a floor surface. The support also includes a brake, a brake actuator for actuating the brake of at least one bearing assembly, and a brake bar coupled to the brake actuator. The brake bar is movable between a non-braking position and a braking position wherein the actuator causes the brake to move to its braking position. Further, the brake bar extends between the head end and the foot end of the frame and further has a portion extending outwardly from the brake actuator to at least close proximity to the bearing footprint defined by the bearing assemblies but within the frame footprint to thereby provide relatively easy access to the brake bar to an attendant standing adjacent one of the longitudinal sides of the frame.

28 Claims, 19 Drawing Sheets

U.S. PATENT DOCUMENTS

| | | | |
|---|---|---|---|
| 4,706,328 | A | 11/1987 | Broeske |
| 4,722,114 | A | 2/1988 | Neumann |
| 4,793,445 | A | 12/1988 | Collignon et al. |
| 4,815,161 | A | 3/1989 | Timmer et al. |
| 4,941,552 | A | 7/1990 | Screen |
| 5,014,391 | A | 5/1991 | Schulte |
| 5,170,529 | A | 12/1992 | Kovacs |
| 5,205,381 | A | 4/1993 | Mehmen |
| RE34,433 | E | 11/1993 | Heiligenthal et al. |
| 5,303,450 | A | 4/1994 | Lange |
| 5,415,252 | A | 5/1995 | Estkowski |
| 5,632,360 | A | 5/1997 | Melara |
| 5,634,532 | A | 6/1997 | Bucher |
| 5,675,864 | A | 10/1997 | Chou |
| 5,988,323 | A | 11/1999 | Chu |
| 6,240,579 | B1 * | 6/2001 | Hanson et al. ............. 5/86.1 |
| 6,240,713 | B1 | 6/2001 | Thomas |
| 6,336,524 | B1 | 1/2002 | Van Loon et al. |
| 6,360,851 | B1 | 3/2002 | Yang |
| 6,460,205 | B1 | 10/2002 | Lewandowski et al. |
| 6,532,624 | B1 | 3/2003 | Yang |
| 6,584,641 | B1 | 7/2003 | Milbredt |
| 6,619,438 | B1 | 9/2003 | Yang |
| 6,662,404 | B1 | 12/2003 | Stroh et al. |
| 6,725,501 | B2 | 4/2004 | Harris et al. |
| 6,810,560 | B1 | 11/2004 | Tsai |
| 6,865,775 | B2 | 3/2005 | Ganance |
| 6,951,034 | B2 | 10/2005 | Shiery et al. |
| 7,017,228 | B2 | 3/2006 | Silverstein et al. |
| 7,182,178 | B2 | 2/2007 | Chung |
| 7,331,428 | B2 | 2/2008 | Chiang |
| 7,546,908 | B2 | 6/2009 | Chang |
| 7,926,145 | B2 | 4/2011 | Liao |
| 2002/0069478 | A1 | 6/2002 | Trivini |
| 2003/0019075 | A1 | 1/2003 | Trevini |
| 2007/0119661 | A1 | 5/2007 | Chang |

\* cited by examiner

PATENT SUPPORT BRAKE SYSTEM

CROSS-REFERENCE TO RELATED APPLICATION

This application claims priority from U.S. Pat. application Ser. No. 61/055,669, filed May 23, 2008, entitled PATIENT SUPPORT BRAKE SYSTEM, which is incorporated by reference herein in its entirety.

TECHNICAL FIELD AND BACKGROUND OF THE INVENTION

The present invention generally relates to a braking system for a wheeled patient support, such as a hospital bed, stretcher, cot, or the like.

SUMMARY OF THE INVENTION

The present invention provides a movable patient support with a braking system that can achieve greater braking force than conventional barking systems.

In one form of the invention, a movable patient support includes a frame, a patient support surface supported at the frame, and a base supporting the frame and having a plurality of bearing assemblies for moving the base along a floor surface. The patient support further includes a brake and a brake actuator. The brake is supported for movement between a non-braking position and a braking position for braking at least one bearing assembly of the bearing assemblies, with the actuator for actuating the brake. In addition, a brake bar is coupled to the brake actuator and is movable between a non-braking position and a braking position, with the actuator causing the brake to move to the braking position when the brake bar is moved to its braking position. In addition, the brake bar extends between the head end and the foot end of the frame and, further, has a portion extending outwardly from the brake actuator to in at least close proximity to the footprint of bearing assemblies but within the footprint of the frame to thereby provide relatively easy access to the brake bar to an attendant standing adjacent one of the longitudinal sides of the frame but without creating a trip hazard.

In another form of the invention, a movable patient support includes a frame, a patient support surface supported at the frame, and a base supporting the frame with a plurality of bearing assemblies for moving the base along a floor surface. The support also includes a brake and a brake actuator as noted above. Further, the support includes a brake bar coupled to the brake actuator, that is pivotable about an axis disposed parallel to the central longitudinal axis of the frame and movable between a non-braking position and a braking position wherein the brake bar causes the actuator to actuate the brake to move to its braking position. In addition, the brake bar includes a pair of connecting portions, for connecting to the brake actuator adjacent the head end and adjacent the foot end of the patient support, and an intermediate portion connecting the connecting portions. The intermediate portion extends adjacent one of the longitudinal sides of the patient support between the connecting portions but is offset inwardly from the longitudinal side of the frame toward the central longitudinal axis of the frame. For example the brake bar may comprise a tubular member, In one aspect, the brake actuator includes a torsional shaft that extends between the foot end and the head end. Further, the brake bar is coupled to the torsional shaft.

In yet further aspects, the brake actuator includes a cam and a linkage coupled to the cam. The linkage is coupled to the torsional shaft, which is rotated about its longitudinal axis when the brake bar is moved to its braking position, thereby moving the linkage, which in turn causes the cam to actuate the brake.

In another aspect, the brake comprises a brake ring. For example, the brake ring may include an annular member with a plurality of concentric ridges, which face the at least one bearing assembly.

In further aspects, the patient support further includes an annular member mounted about one of the stems of the bearing assemblies. In addition, the patient support includes a locking arm coupled to the linkage, which moves the locking arm into engagement with the annular member to thereby arrest swiveling of the bearing assembly when the brake bar is moved to its braking position. For example, the annular member may include a plurality of upwardly facing notches, with the locking arm engaging the annular member at one of the notches to thereby arrest the swiveling of the bearing assembly. In addition, the locking arm may be pivotally mounted relative to the frame about a vertical pivot axis, with the linkage pivoting the locking arm about the vertical axis to thereby engage the annular member when the brake bar is moved to its braking position.

In yet a further aspect, the patient support includes a spring urging the locking arm into engagement with the annular member when pivoted about the vertical axis toward the annular member.

In other aspects, in any of the patient supports, the base may include a head end base member and a foot end base member, with the actuator extending between the head end base member and the foot end base member. Further, the base may include a longitudinal member extending between the head end base member and the foot end base member, with the longitudinal member, the head end base member, and the foot end base member forming a base frame. Further, the actuator may be at least partially enclosed by the longitudinal member.

According to yet another form of the invention, a movable patient support includes a frame and a patient support surface supported at the frame. A base supports the frame and includes a plurality of bearing assemblies for moving the base along a floor surface. The base also includes a head end base member, a foot end base member, and a longitudinal member extending between the head end base member and the foot end base member, with the longitudinal member, the head end base member, and the foot end base member forming a base frame. A brake is supported for movement between a non-braking position and a braking position for braking at least one of the bearing assemblies. In addition, the patient support includes a brake actuator for actuating the brake, which is at least partially enclosed by the longitudinal member. An annular member is mounted about at least one of the bearing assembly stems for selectively locking the swivel of the one bearing assembly about its stem. Further, the patient support includes a locking arm pivotally mounted at the base and coupled to the actuator, with the locking arm being moveable between an unlocked position and a locking position. When the brake actuator actuates the brake, the locking arm is engageable with the annular member for locking the bearing assembly from swiveling about its swivel axis.

In one aspect, the annular member includes a plurality of notches, with the locking arm engaging the annular member at one of the notches to thereby arrest the swiveling of the at least one bearing assembly. For example, the locking arm may include a tab, which is sized to fit into the notches.

In further aspects, the locking arm pivots about a vertical axis when moved from its unlocked position to its locking position.

In addition, the support may include a spring urging the locking arm into engagement with the annular member when pivoted about the vertical axis toward the annular member.

According to yet another form of the invention, a movable patient includes a frame, a patient support surface supported at the frame, and a base supporting the frame with a plurality of bearing assemblies for moving the base along a floor surface. The support also includes a brake supported for movement between a non-braking position and a braking position for braking at least one bearing assembly. In addition, the brake comprises an annular body extending around the swivel axis, with a plurality of annularly spaced ridges which form distal edges for engaging the bearing assembly. Further, the support includes a brake actuator for actuating the brake wherein when the brake actuator is actuated the annular body moves toward the at least one bearing assembly and engages the bearing assembly with the ridges.

In one aspect, the ridges are offset from each other and further wherein the distal edges are at varying distances from the annular body. Additionally, the distal edges of the ridges may lie on an arc, for example, an arc of similar curvature to the bearing assembly so that the distal edges will may contact with spaced points around the bearing assembly at approximately the same time.

In other aspects, a brake bar is coupled to the brake actuator and is movable between a non-braking position and a braking position wherein the actuator causes the brake to move to its braking position.

Accordingly, the present invention provides a patient support with a braking system that may provide an increased braking force against rotational and swivel motion of the support bearing assemblies.

These and other objects, advantages, purposes, and features of the invention will become more apparent from the study of the following description taken in conjunction with the drawings.

DETAILED DESCRIPTION OF THE FIGURES

DETAILED DESCRIPTION OF THE PREFERRED EMBODIMENT

Figure 1:
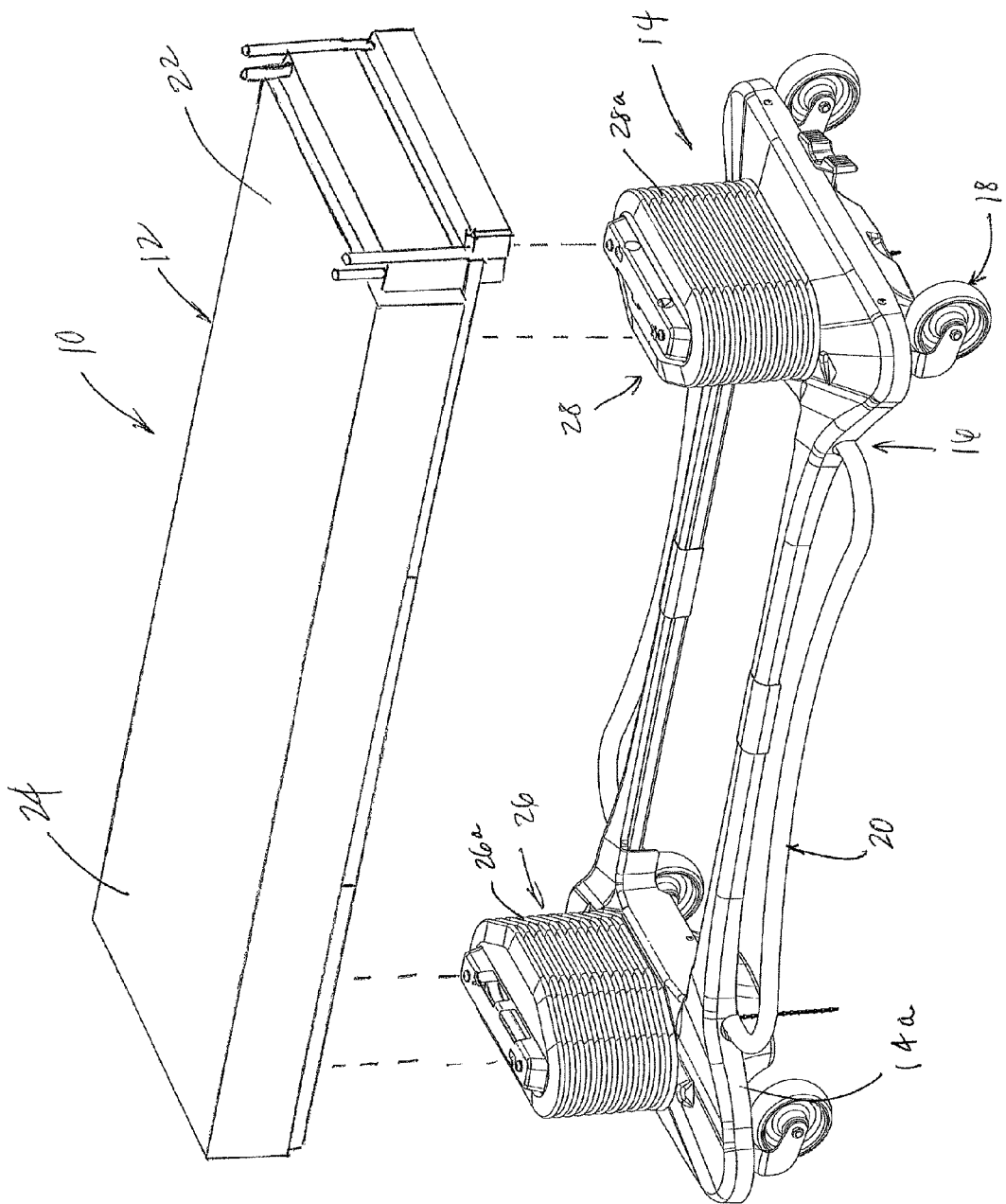
FIG. 1 is a exploded perspective view of a patient support incorporating a braking system of the present invention.
Figure 2:
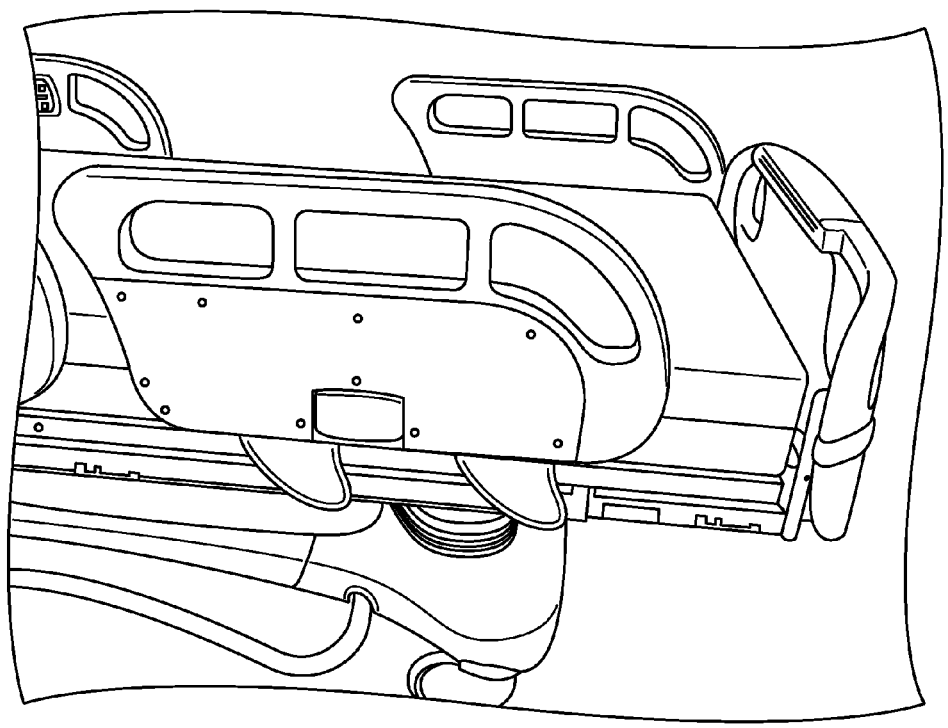
FIG. 2 is a foot end view of the patient support of FIG. 1 illustrating the support with a footboard and side rails attached.
Figure 3:
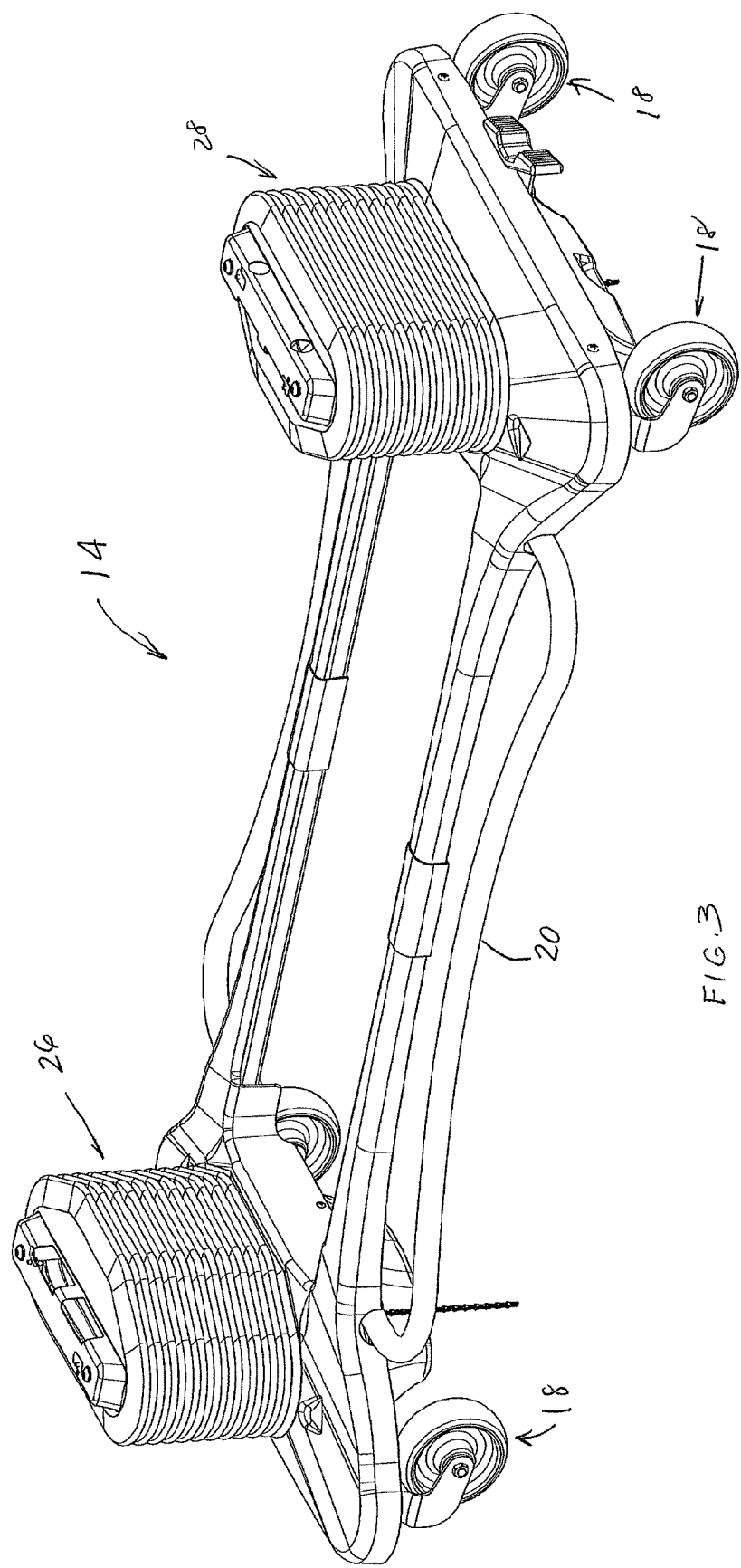
FIG. 3 is an enlarged view of the base of the patient support of FIG. 1 illustrating the brake bar of the braking system in an unlocked position.
Figure 4:
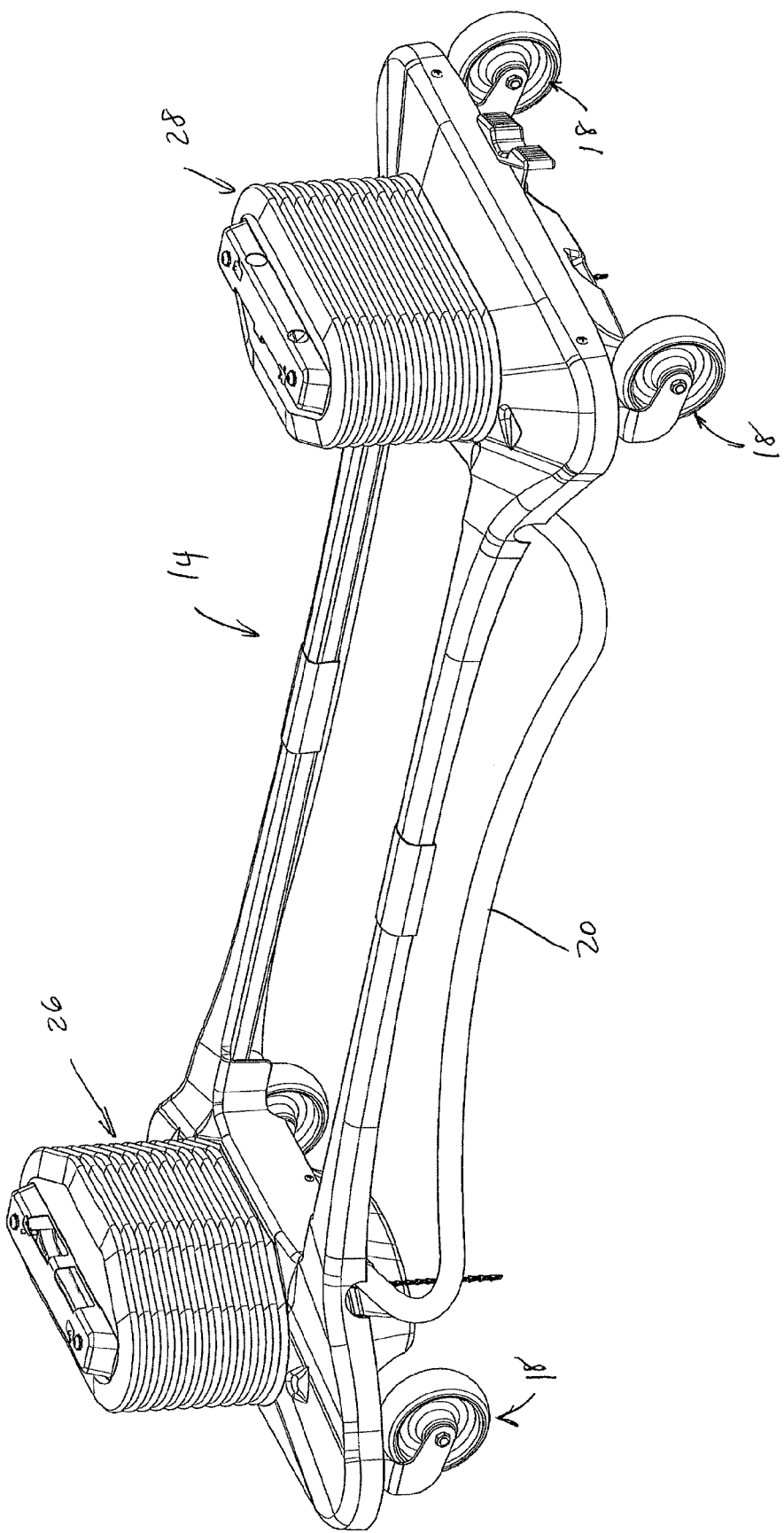
FIG. 4 is a similar view to FIG. 3 illustrating the brake bar of the braking system in a locked position.

Referring to FIG. 1, the numeral 10 generally designates a patient support of the present invention. Patient support 10 includes a patient support surface 12 and a base 14, which incorporates a braking system 16 that provides both rotational braking of the bearing wheel assemblies 18 as well as a swivel lock. As will be more fully described below, braking system 16 is configured to provide enhanced access to the brake bar of the braking system and, further, to provide an increased braking force, which may be particularly important in some applications, for example, when dealing with larger patients or when it is important for the patient support to be stationary.

Referring to FIGS. 1-6, braking system 16 includes one or more longitudinal brake bars 20, which generally extend between a head end 22 of the patient support and a foot end 24 of the patient support. Optionally, patient support 10 may incorporate lifting mechanism 26 and 28 for raising and lowering patient support surface 12 relative to base 14, with the brake bars 20 then extending between the respective lifting mechanisms 26 and 28. For example of details of lifting mechanisms 26 and 28, reference is made herein to U.S. Pat. No. 5,343,581, which is incorporated by reference herein in its entirety and further which is commonly assigned to Stryker Corporation of Kalamazoo, Mich.

Figure 5:
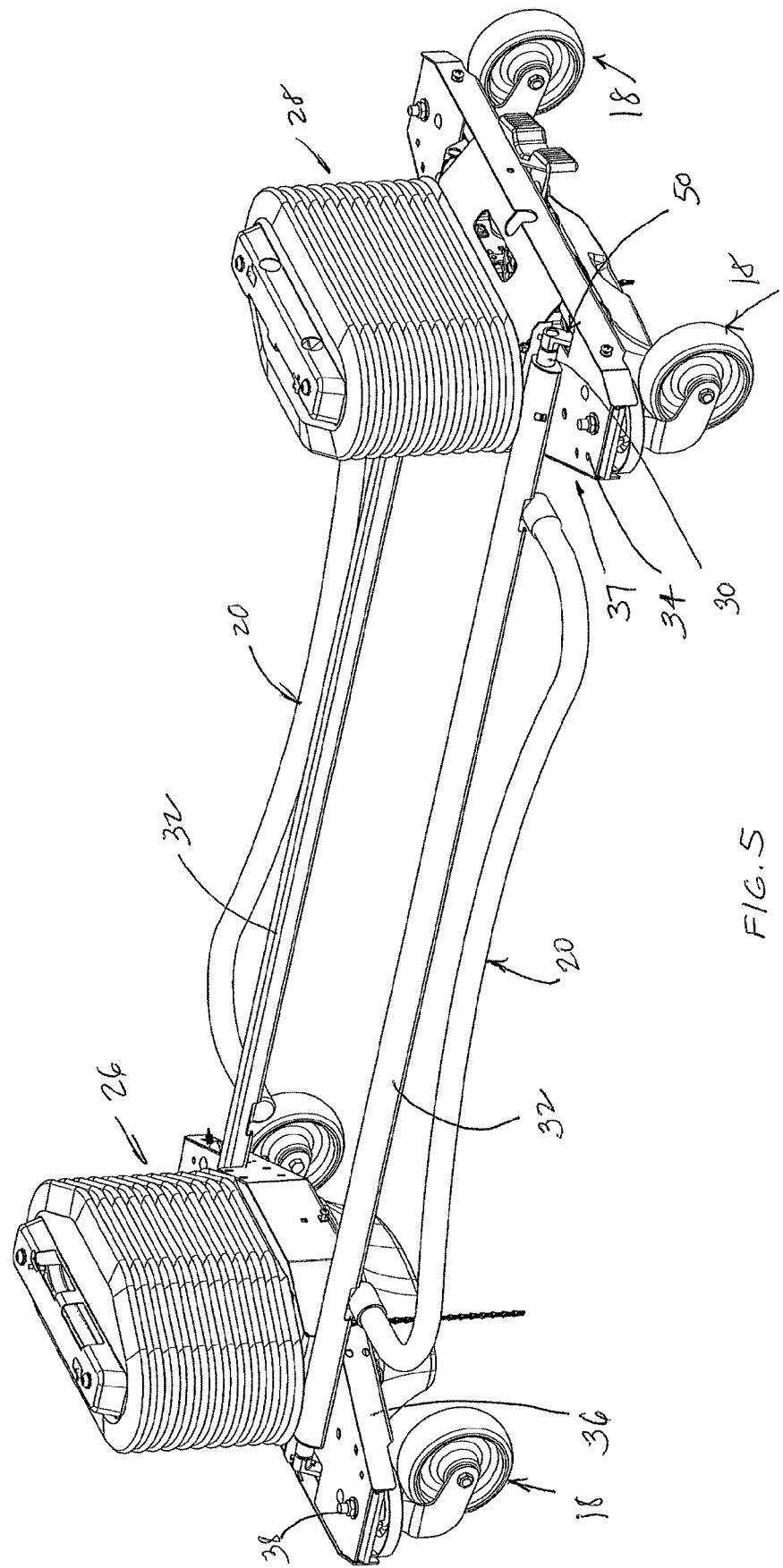
FIG. 5 is a similar view to FIG. 3 illustrating the braking system in an unlocked position with the cover(s) of the base removed for clarity.
Figure 6:
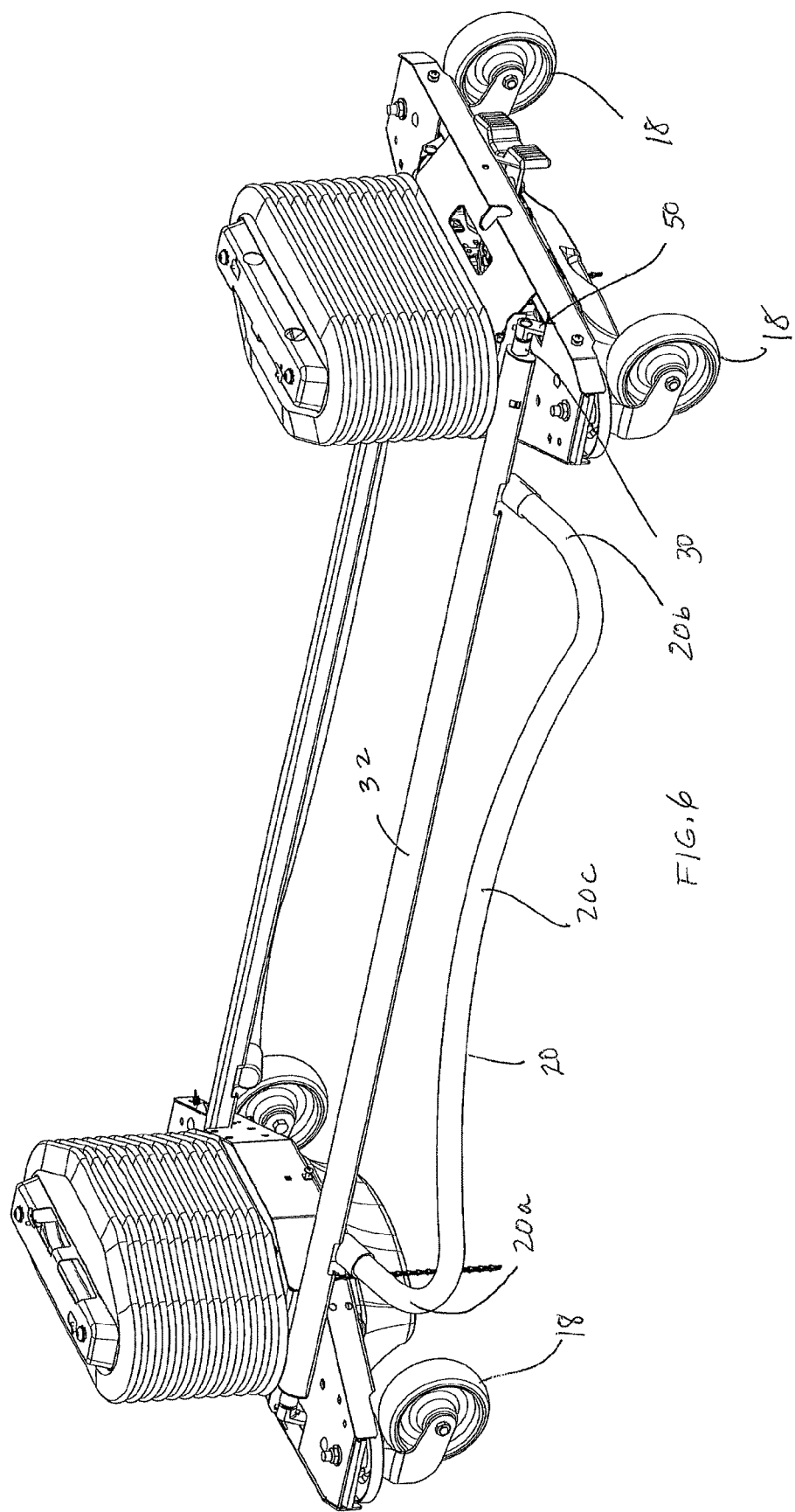
FIG. 6 is a similar view to FIG. 5 illustrating the brake bar moved to a locked position.
Figure 7:
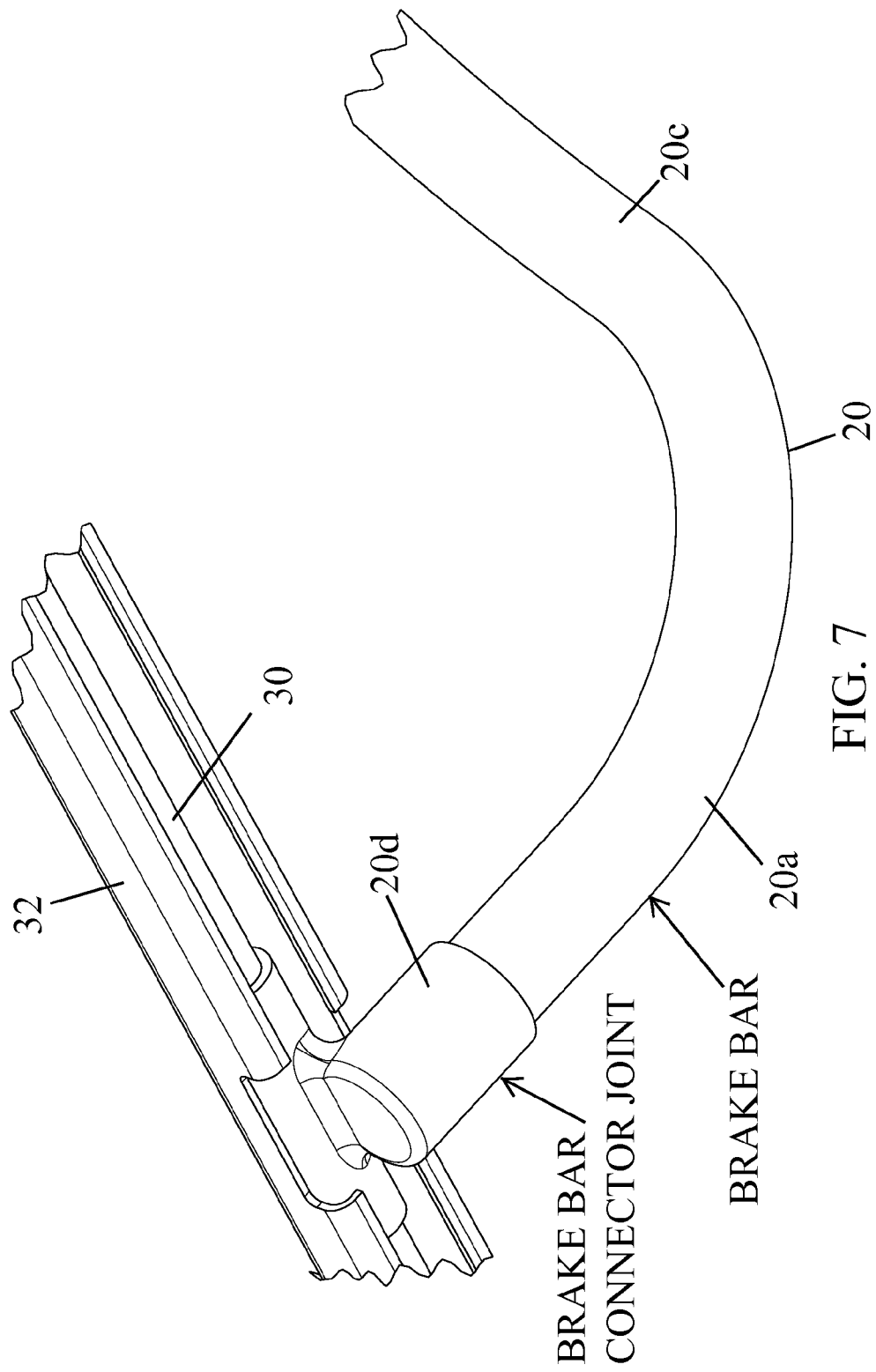
FIG. 7 is an enlarged bottom perspective view illustrating the connection between the brake bar and the torsion shaft of the braking system.
Figure 8:
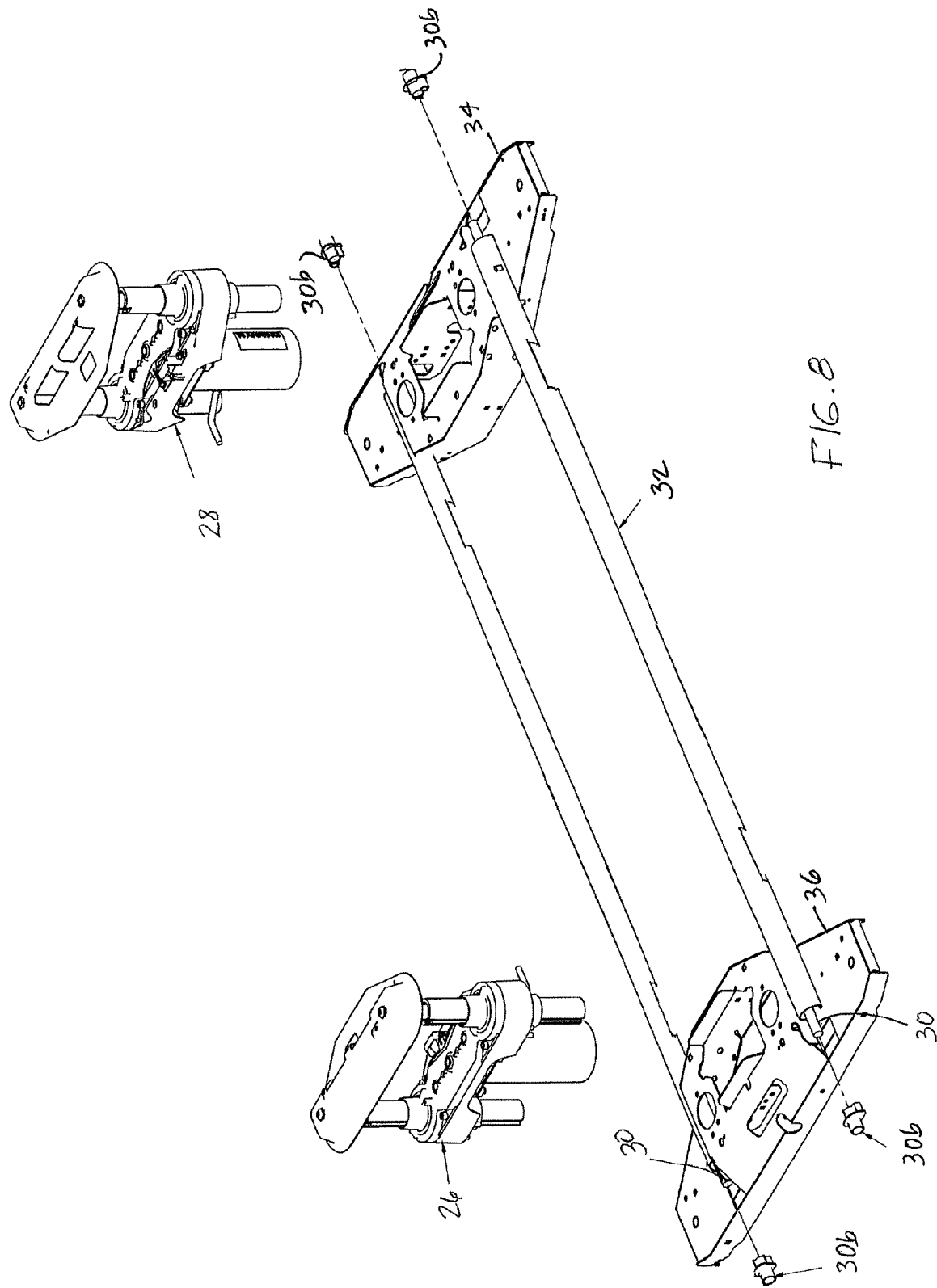
FIG. 8 is a similar view to FIG. 6 with the covers and further the lifting mechanisms removed to show the base frame as well as the torsional shaft.
Figure 9:
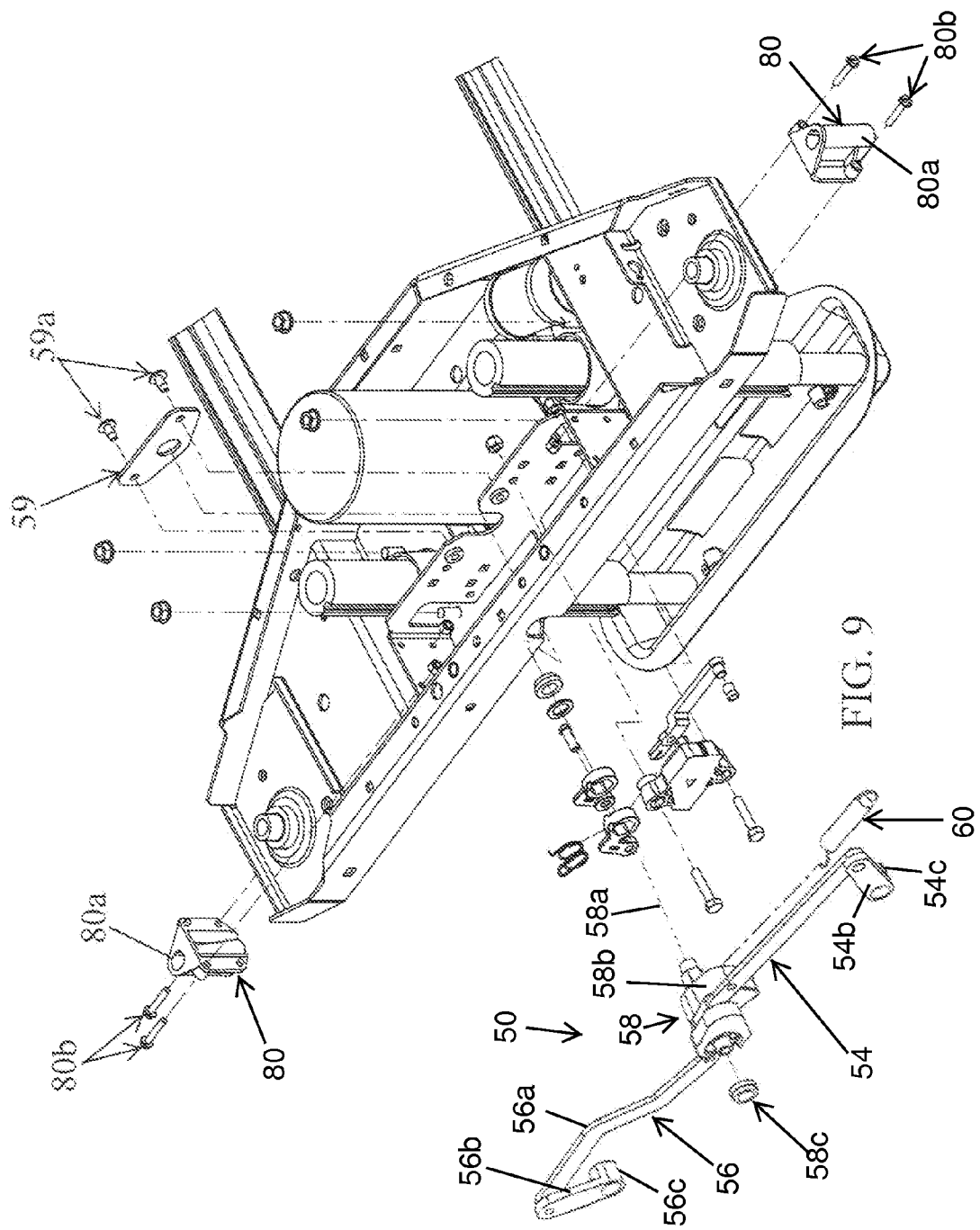
FIG. 9 is an exploded perspective view of a base end member, lifting mechanism, and the braking system cam assembly.
Figure 13:
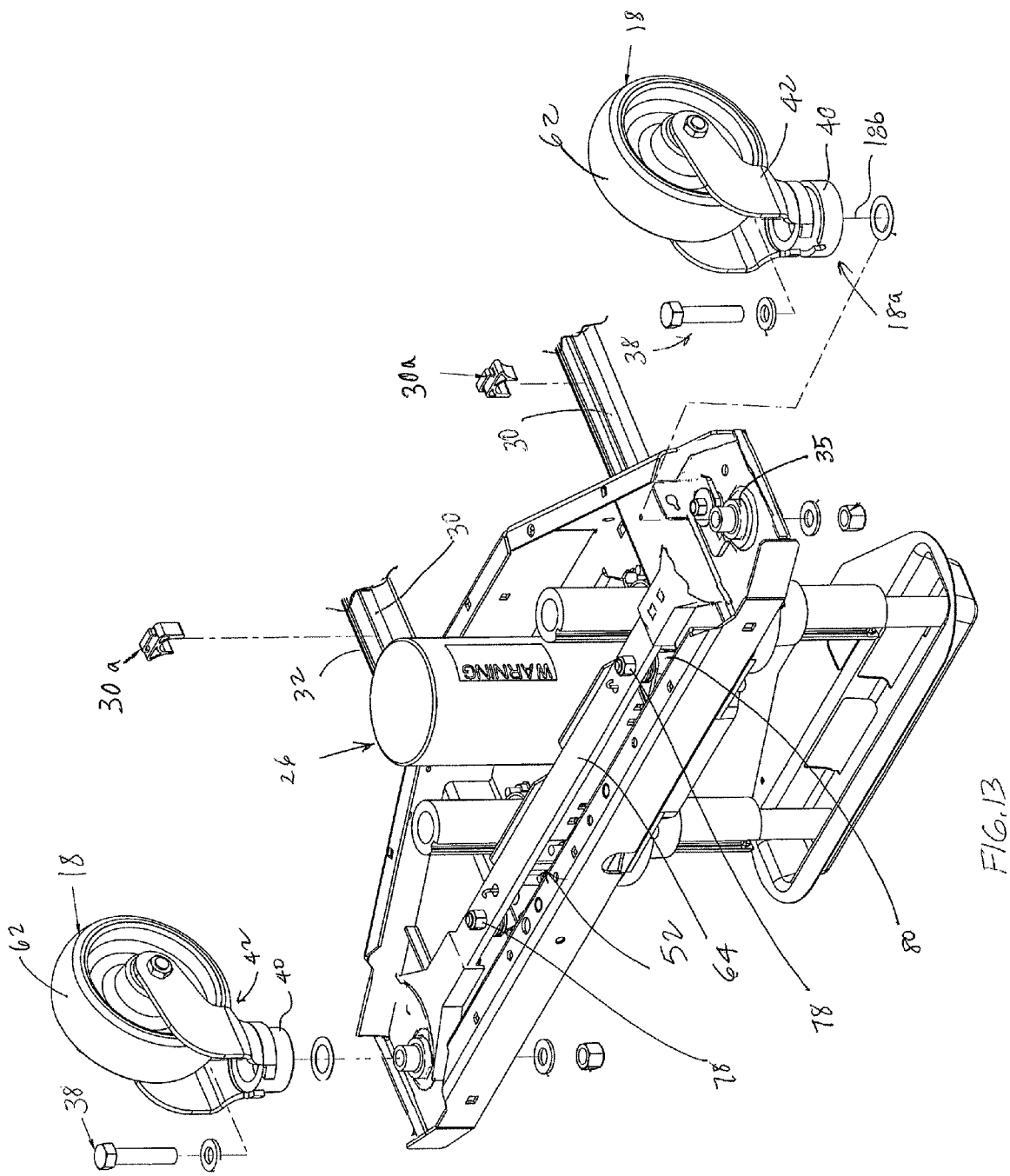
FIG. 13 is bottom perspective view of one of the base end members illustrating the mounting of the caster bearing assemblies.
Figure 14:
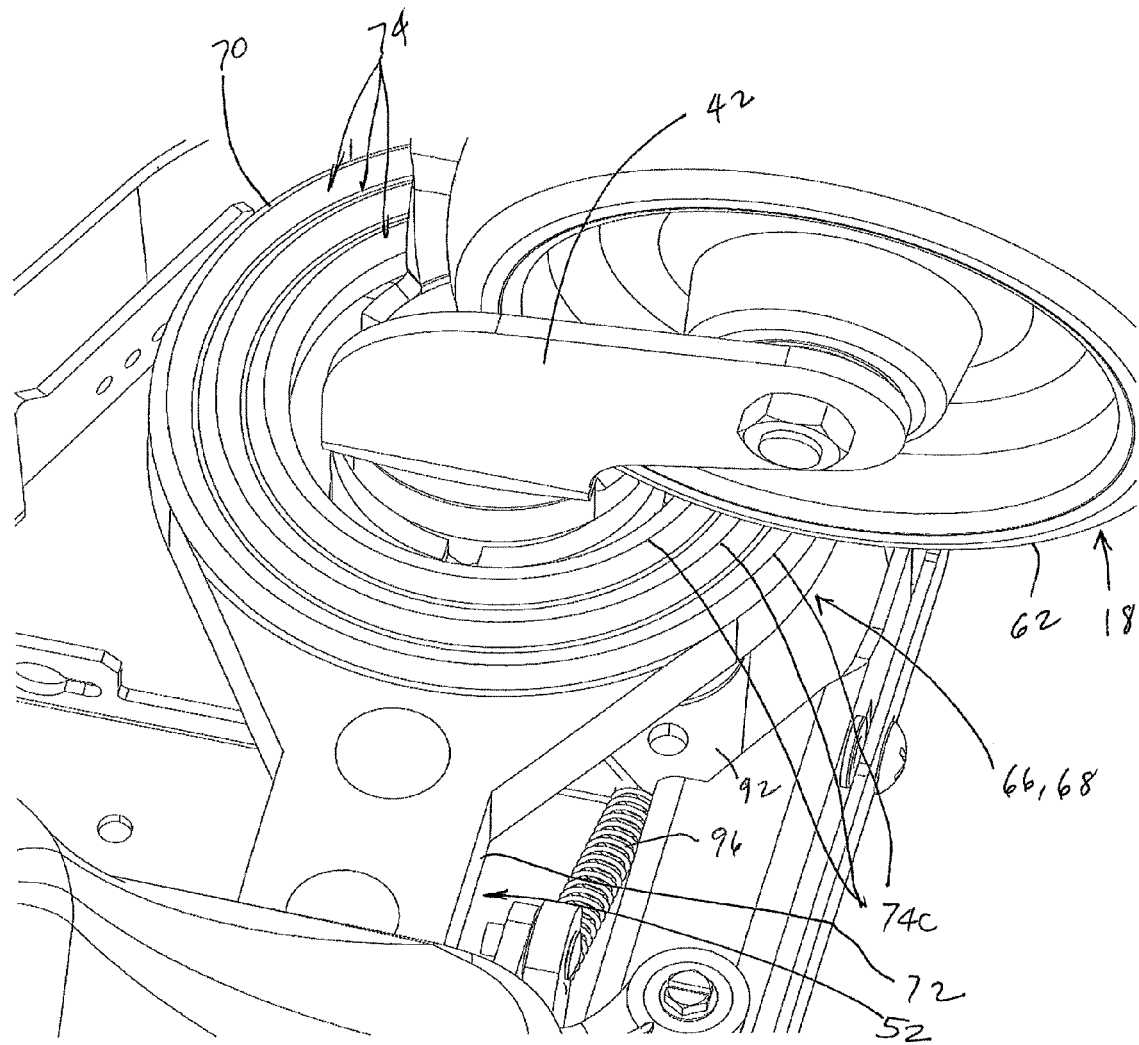
FIG. 14 is an enlarged bottom perspective view illustrating one embodiment of one of the brake rings positioned about the bearing assembly stem.

As best understood from FIGS. 5-7, brake bars 20 couple to two longitudinal torsional shafts 30 (also see FIG. 13). Each brake bar 20 may be formed from a tubular member which is formed into a generally C-shaped configuration and forms two connecting portions 20a, 20b and a longitudinal portion 20c that extends between the connecting portions 20a, 20b. Each connecting portion 20a, 20b couples to the torsional shaft 30 generally at each end (feet end or head end) of the patient support but within the footprint of the frame and also of the bearing assemblies. Further, the connecting portions 20a, 20b couple to the torsional shaft inward (longitudinal inward) of the lifting mechanisms. In addition, the connecting portions 20a, 20b extend outwardly from the torsional shafts to a location in close proximity to the bearing assembly footprint, either just inside or just outside the bearing assembly footprint to provide relatively easy access to the bar to an attendant standing adjacent the longitudinal side of the patient support. Optionally, the connecting portions 20a, 20b are also within the footprint of the frame. The longitudinal portion 20c extends generally parallel to the central longitudinal axis of the patient support and, further, inward from the longitudinal sides so as to also remain within the footprint of the frame as well as within or in close proximity to the bearing assembly footprint.

Shafts 30 extend between head and foot base end members 34 and 36 and are at least partially enclosed in longitudinal members 32, which are secured to base end members 34 and 36 and thereby form a base frame 37. Further, members 32 provide support for torsional shaft 30 as well as provide protection to a user from the rotation of the shaft when the brake bar is being operated. In the illustrated embodiment, end members 34, 36 comprise stamped sheet metal members, while longitudinal members 32 comprise rounded channels or open sectioned metal members. Further, longitudinal members 32 may be fastened to end members 34 and 36 by fasteners or by welds to form a relatively rigid base member 37.

As noted above, base 14 includes a plurality of caster bearing assemblies 18 whose bases and stems 18a are mounted to base end members 34 and 36 on posts 35, which are, for example, welded to members 34 and 36. Stems 18a are secured to the posts by fasteners 38, such as bolts and washers (see also FIG. 13). Referring to FIG. 13, bolts 38 extend through the bases 40 of the caster assembly brackets 42 to thereby secure the bearing assemblies to members 34 and 36 and, further, provide swivel axes 18b.

Referring again to FIGS. 5-7, each of the brake bars 20 is rigidly coupled to a respective torsional shaft 30 by a coupler 20d (FIG. 7) so that when a force is applied to the brake bar, at for example the distal end of connecting portion 20a or 20b or to intermediate portion 20c, the intermediate portion 20c moves downward, as shown in FIG. 5. As brake bar 20 rotates about its connection portions 20a, 20b as shown in FIG. 6, brake bar 20 induces rotation of shaft 30 about its longitudinal axis. This rotation will generate a braking force to stop the patient support, which will be more fully described below.

As best seen in FIG. 13, torsional shafts 30 are supported in longitudinal members 32 by a plurality of bearing supports 30a, which mount over shafts 30 and are secured in longitudinal members 32 and provide bearing surfaces for the torsional shafts. Mounted to the opposed ends of each rotational shaft 30 are brake shaft bushings 30b, which in turn couple to a cam assembly 50, which is supported in the respective base end member 34, 36 described below. When brake bar 20 is rotated downward to its braking position, torsional shaft 30 will cause cam assembly 50 to apply a downward force on a brake 52 (see FIGS. 12-13), which applies a braking force to the respective bearing assemblies.

Referring again to FIG. 10, cam assembly 50 includes a pair of crank arms 54 and 56, which project outwardly from a central cam body 58 and is mounted in each respective end base member 34, 36 by a bracket 59, which is secured to the base end member by fasteners 59a, and a bushing 58c, which mounts into the side wall of the base end member. Each crank arm 54, 56 includes a first link 54a, 56a and a second link 54b, 56b, which are pivotally mounted to distal ends of first links 54a, 56a, respectively, at their respective distal ends to form the crank arms. Further, each link 54a, 56b includes a sleeve 54c, 56c for receiving a respective brake shaft bushing 30b of a respective torsional shaft 30 and further a pin 55 (FIG. 11) for securing the crank arm to the bushing. In this manner, when torsional shaft 30 is rotated about its longitudinal axis, the respective links 54b and 56b will rotate with the shaft and push links 54a, 54b inward toward the central longitudinal axis of support 10 to thereby rotate the cam body about its central axis 58a. With this rotation, the lobe 58b of cam body 58 will be moved between a non-actuating position, such as shown in FIG. 10, to an actuating position in which the lobe will engage and push brake 52 towards bearing assemblies 18.

Figure 10:
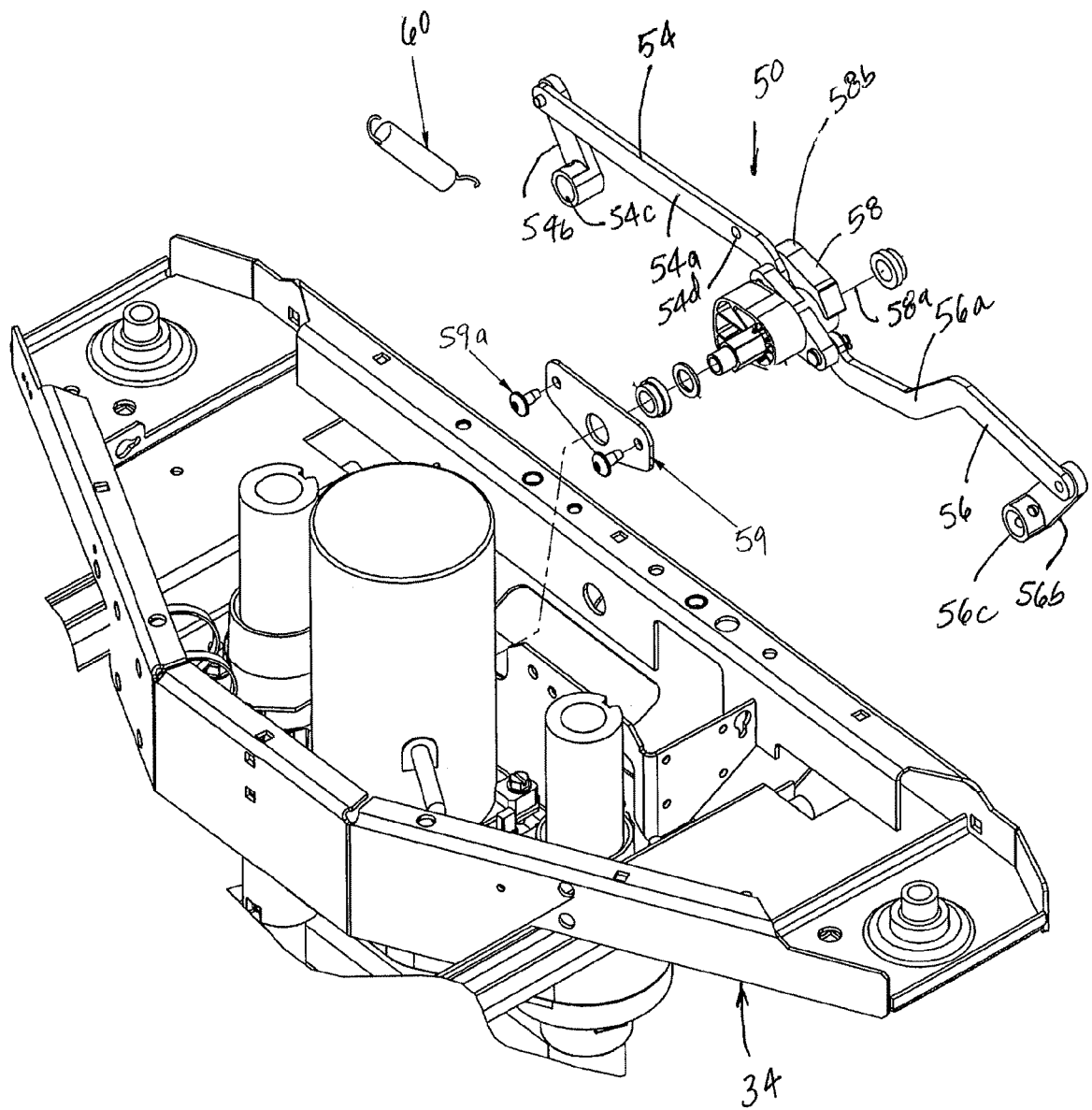
FIG. 10 is another exploded perspective view of the base end member, lifting mechanism, and cam assembly.
Figure 11:
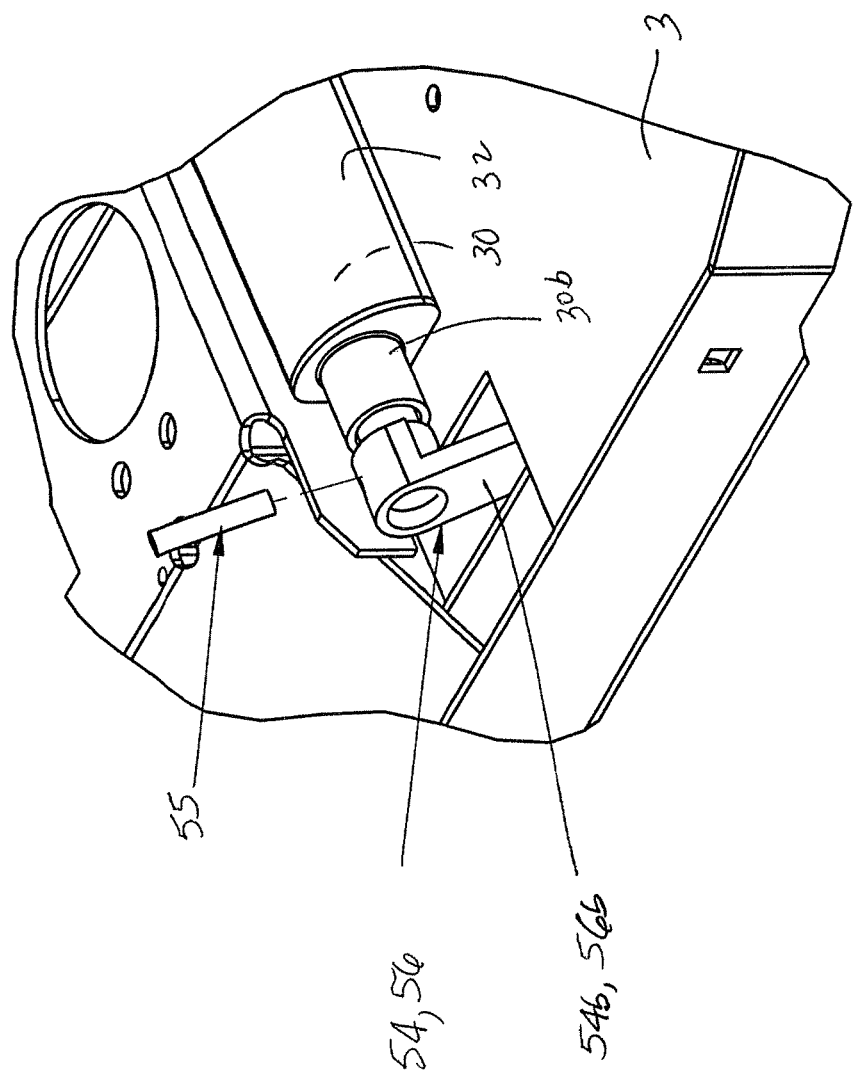
FIG. 11 is an enlarged detailed view illustrating the coupling between the cam assembly linkage and the torsional shaft.

When the brake bar is no longer rotated downwardly, the cam assembly will be returned to its non-braking configuration by a spring 60, with the lobe 58b returned to its non-actuating position, such as shown in FIG. 10. In the illustrated embodiment, spring 60 comprises a coil spring with one end of the spring coupled to crank arm 54 at opening 54d and the other end of the spring anchored to the respective base end member 54, 56. It should be understood that the details provided herein are applicable for both base end members, with the head end base member being generally a mirror image of the foot end member.

Figure 12:
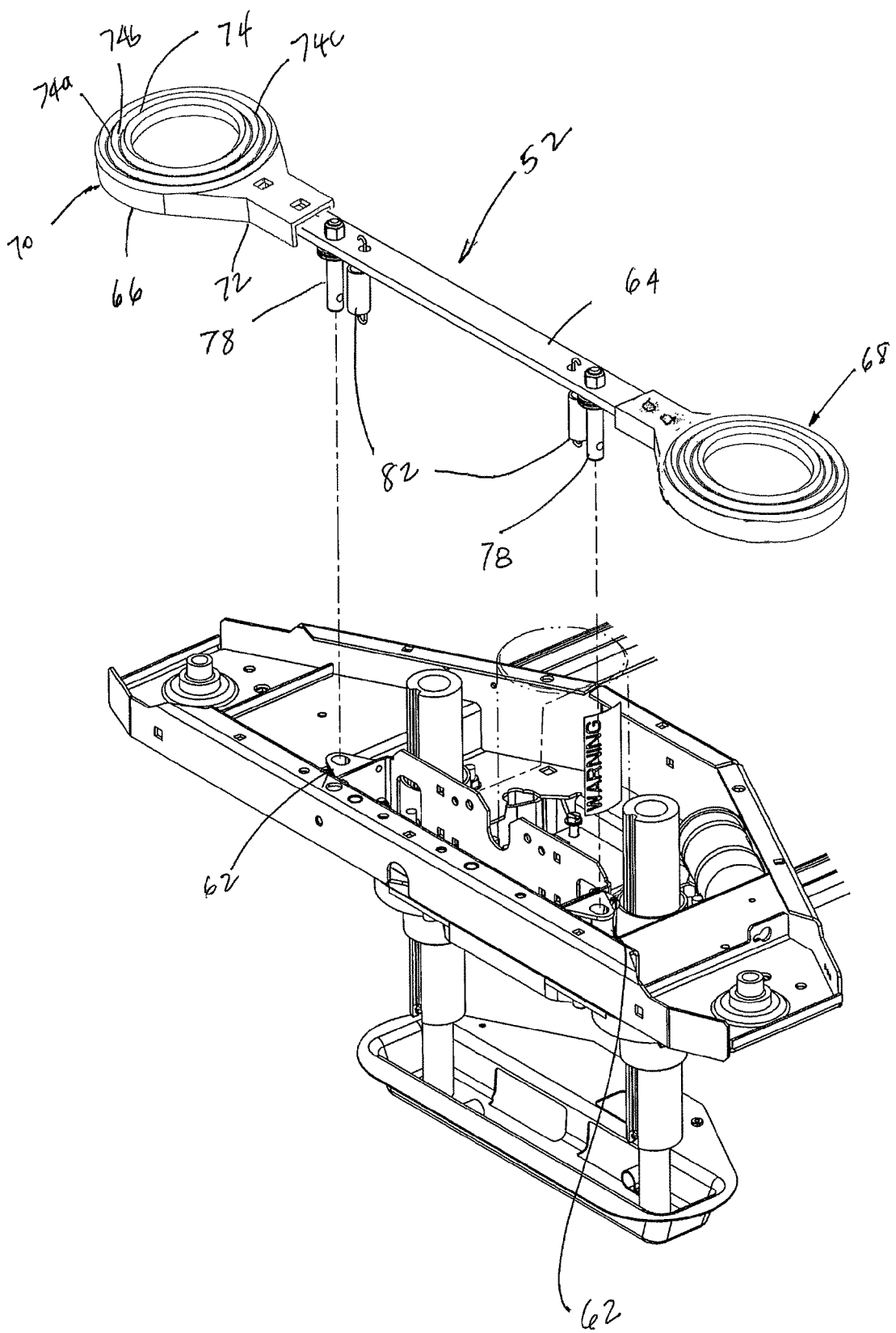
FIG. 12 is another exploded perspective view of a base end member illustrating the braking rings.

As noted above, when actuated, cam assembly 50 moves brake 52 toward bearing assemblies 18 and, more specifically, to the wheels 62 of the bearing assemblies. Referring to FIGS. 12 and 13, brake 52 includes a transverse bar 64 and a pair of brake rings 66 and 68, which are mounted to the opposed ends of bar 64, for example by fasteners or by welds. Bar 64 and/or brake rings 66 and 68 are optionally formed form a metal material, such as steel or aluminum or any other suitable metallic material. Each brake ring 66, 68 includes an annular body 70 and a yoke 72, which extends form annular body 70 and mounts the respective brake ring to bar 64.

Figure 15A:
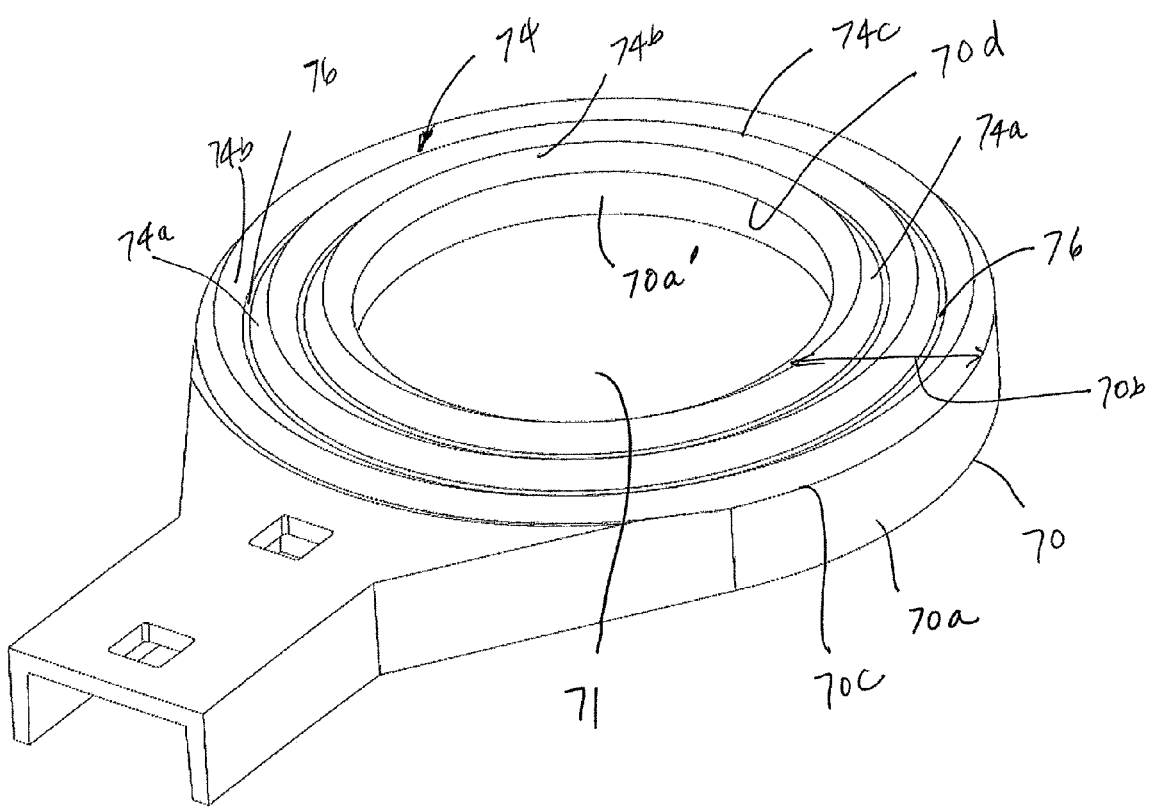
FIG. 15A is an enlarged perspective view of the brake ring of FIG. 14.
Figure 15B:
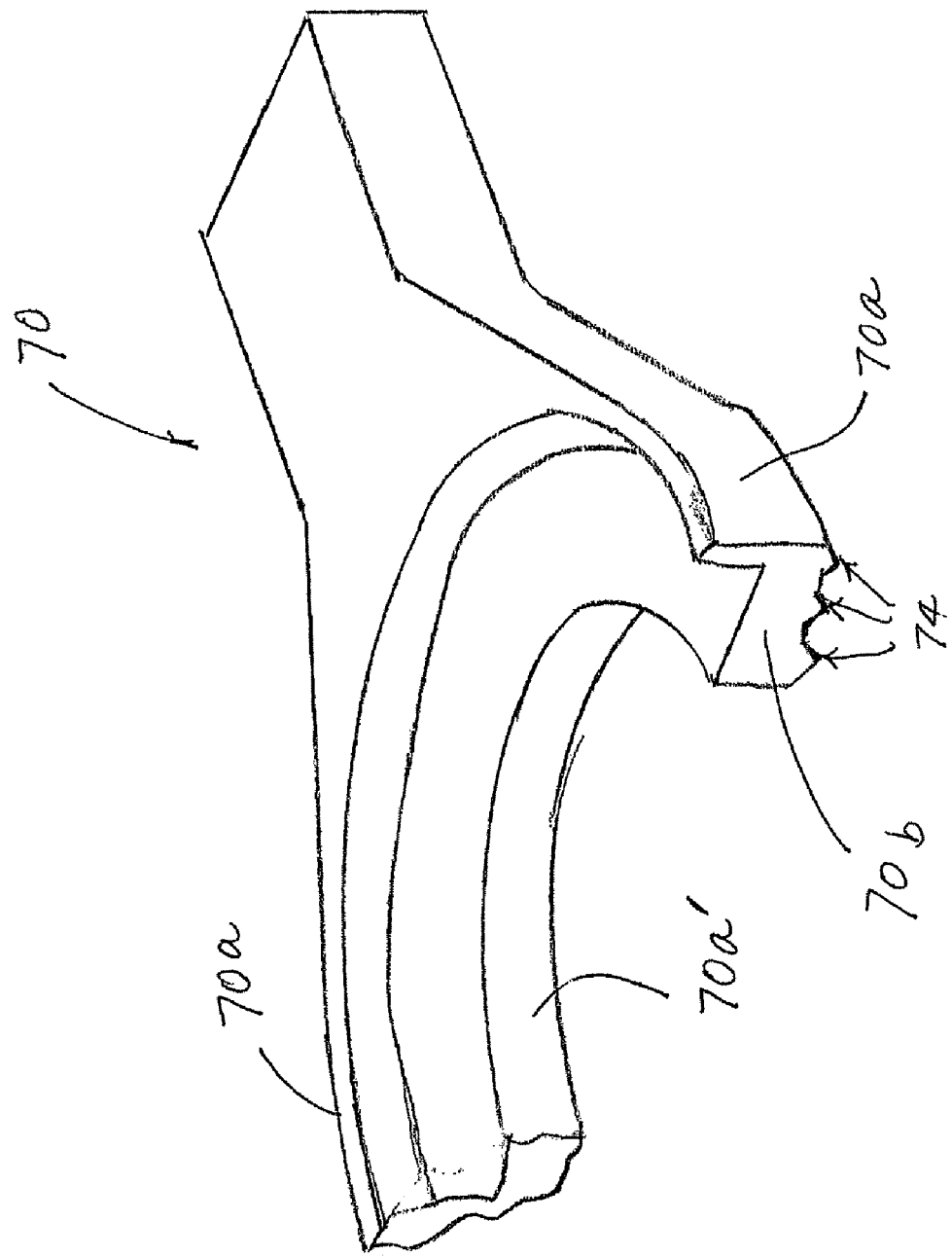
FIG. 15B is a bottom fragmentary perspective view of the brake ring of FIG. 15A.

As best seen in FIG. 15A, annular body 70 includes a plurality of radially spaced ridges 74, which project upwardly from annular body (as viewed in FIG. 12). Each ridge 74 is triangular in cross-section and includes outer and inner angled surfaces 74a and 74b and a distal edge 74c, which provides a sharp annular edge. For example, each brake ring 66, 68 may include two or more ridges. In the illustrated embodiment, each brake ring 66, 68 includes three concentric annular ridges. Referring again to FIG. 15A, annular ridges 74 may be spaced from each other to define a planar annular surface 76 between each ridge or may be located immediately adjacent each other so that the inwardly facing surface 74b of one ridge is adjacent the outwardly facing surface of an adjacent ridge. For example, the angles formed between the angled surfaces of each respective ridge may fall in a range of 20° to 70°, between a range of 30° to 60°, or optionally between a range of 40° to 50°. Further, as best seen in FIG. 15B, the annular body 70 includes a vertical outer perimeter side wall 70a, a transverse web 70b on which annular ridges 74 are formed, an inner annular surface 70a, which defines a central opening 71.

In the illustrated embodiment, the outermost ridge is located with the base of its outer angled surface being positioned at the outermost perimeter 70c of annular body 70, while the innermost ridge is located such that the base of its inwardly facing angled surface aligns with the inner perimeter 70d of annular body 70. Further, in the illustrated embodiment, ridges 74 are arranged such that the distal edge 74c of each ridge lies in an arc so that the distal edges may contact with a respective wheel at spaced locations around the wheel and optionally at the same time. To that end, the arc on which the distal edges lie may have the same radius of curvature as the wheel—in this manner, when the brake ring is moved toward the wheel, the distal edges will contact the wheel at spaced location around the wheel at approximately the same time. This may be achieved by varying the height oat the ridges or providing a curved transverse portion between outer perimeter wall 70a and inner annular surface 70a. It should be understood that each ridge may have a different slope associated with its angled surfaces, or all of the angled surfaces of each of the ridges may have a substantially equal slope.

Referring to FIG. 13, each brake 52 is mounted to a respective base end member 34, 36 by a pair of guide pins 78 (FIG. 12), which extend through brake bar 64 and into corresponding sleeves 80, which are mounted in base members 34, 36 by fasteners. In addition, brake 52 is biased by a pair of springs 82, such as a pair of coil springs, to a non-braking position. Springs 82 are similarly mounted to brake bar 64 and, further, are coupled at their opposed ends to the respective end base member.

When mounted to the respective base end members 34, 36, brake 52 is aligned with cam assembly 50 and positioned over cam body 58. In this manner, when brake bar 20 is pivoted downward as shown for example in FIG. 3, brake bar 20 will induce rotation of shaft 30 about its longitudinal axis, which in turn will cause the respective crank arm 54, 56 to rotate cam body 58 about its rotational axis 58a so that lobe 58b will be moved into engagement with brake bar 64, which acts as a cam follower to thereby move brake 52 toward the respective bearing assemblies. When brake rings 66 and 68 are urged toward the respective bearing assemblies, their annular ridges 74 and, more specifically, outer distal edges 74c will apply a compression force on the respective wheel. With the reduced contact area provided by the respective ridges, the local pressure on the wheels at the point of contact is increased and, further, may deform the wheel surface (at the point of contact) to thereby increase the force necessary to rotate the wheel against the brake. In addition, the first ridge may contact the wheel at or slightly offset from the vertical central axis of the wheel, for example, in a range of 0° to 5.5°. The middle or second ridge may be offset from the central vertical axis of the wheel in a range of 5.5° to 12.5°, and the third or outer ridge may contact the wheel offset from the central vertical axis in a range of 17.5° to 20°. Thus, the ridges may span over an arcuate range of the wheel in a range from about 12.5° to 20°.

Figure 16:
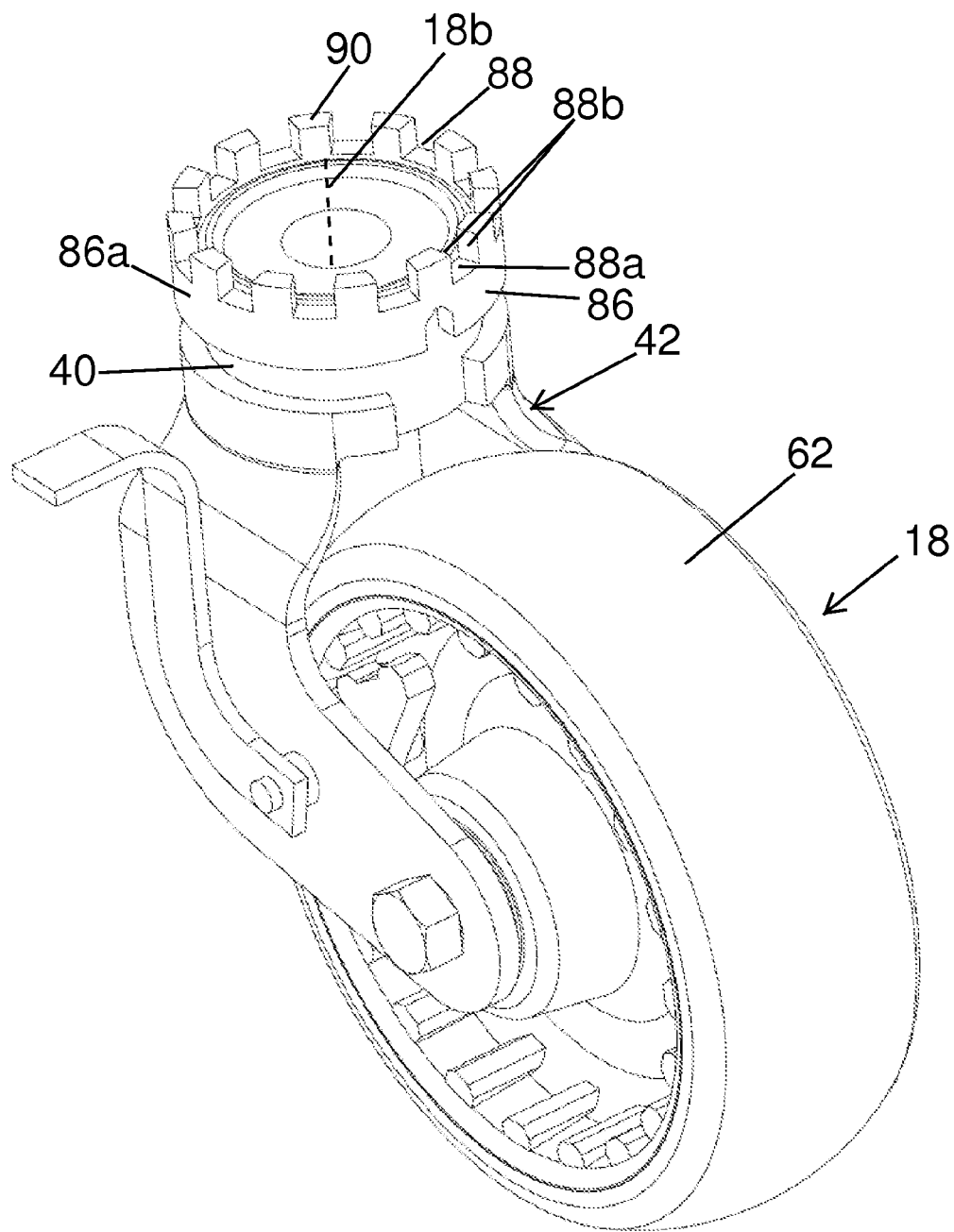
FIG. 16 is an enlarged perspective view of a brake caster wheel assembly with a swivel lock device.
Figure 17:
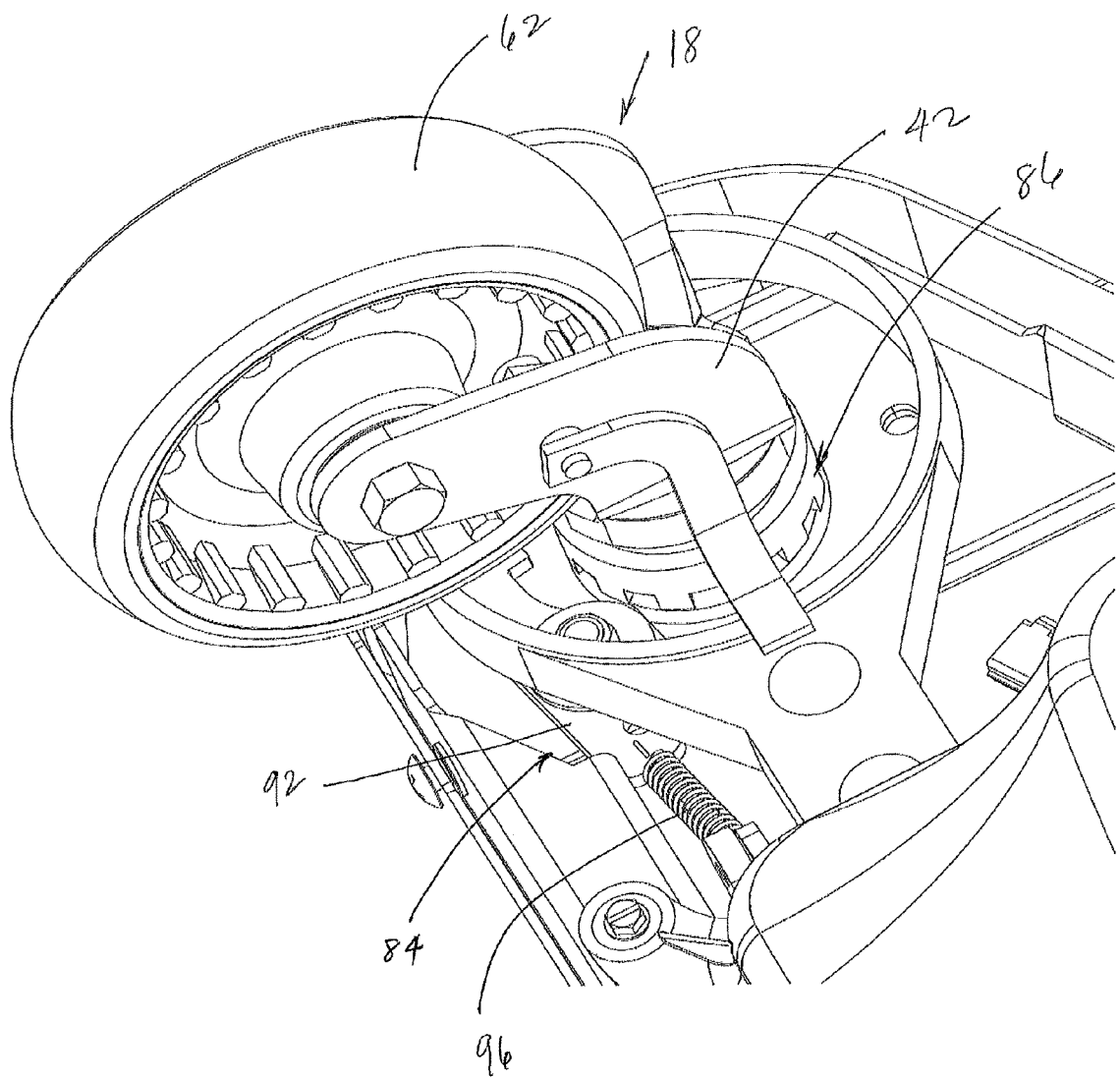
FIG. 17 is a bottom perspective view of the bearing assembly of FIG. 16 and the locking arm for engaging the swivel lock.
Figure 18:
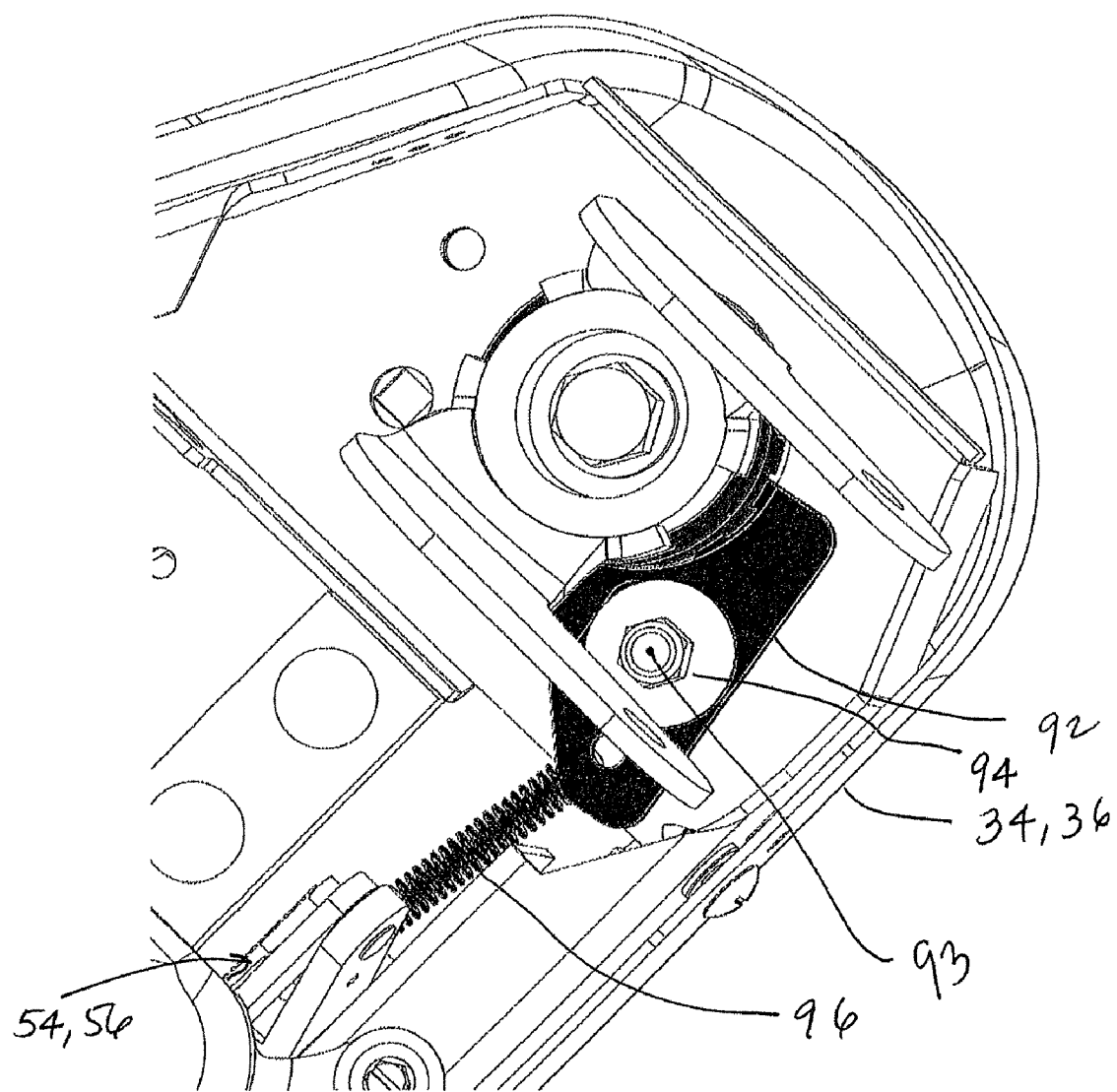
FIG. 18 is an enlarged bottom plan view illustrating the locking arm of the swivel lock device.

Referring to FIGS. 16-18, brake system 16 optionally includes a swivel lock brake assembly 84. Swivel lock brake assembly 84 may be provided to increase the braking capacity of braking system 16 by providing an additional locking feature about one or more of the respective bearing assemblies. For example, referring to FIG. 16, swivel lock brake assembly 84 includes an annular member 86 that is mounted about the respective stem 18a of the each respective bearing assembly bracket 42. In the illustrated embodiment, each stem 18a is formed from an annular base 40 of the respective bracket 42. And, each annular member 86 is rigidly coupled to the respective annular member 40 so that it rotates with the stem 18a when bearing assembly 18 is free to swivel. For example, annular member 86 may be welded to stem 40.

To provide a locking function, annular member 86 includes a plurality of upwardly facing notches 88 (as viewed in FIG. 16), which are formed between a plurality of spaced teeth 90. As best understood from FIG. 16, annular member 86 includes an annular wall 86a in which notches 88 are formed to thereby form the respective teeth 90. Therefore, the width of the respective teeth 90 is substantially equal to the width of wall 86a of annular member 86. Teeth 90 may be evenly spaced around the central axis 86a of annular member 86, which is concentric with rotational axis 18b of the bearing assembly 18. For example, annular member 86 may comprise a metal ring, with the notches formed around its circumference. For example, notches 88 may be uniformly spaced around axis 86a, for example in a range of 20° to 40° apart, or in the illustrated embodiment, about approximately 30° apart. It should be understood that the spacing may be modified depending on the design requirements. Further, each notch is generally rectangular in shape, with a bottom side 88a and two opposed generally parallel spaced apart sides 88b.

Referring to FIGS. 17 and 18, to lock the position of annular member 86, annular member 86 is engaged by a locking arm 92. Locking arm 92 is mounted to the underside of the respective base end member 34, 36. In the illustrated embodiment, locking member 92 is mounted for pivotal movement about a generally vertical axis 93 by a pin or bolt 94, which extends into and is secured to the respective base end member. Each locking member 92 includes a tab or finger for extending into a respective notch of the annular member 86 to thereby lock the respective bearing assembly about its swivel or rotational axis 18b. Locking member 92 is actuated by brake bar 20 and cam assembly 50.

As best seen in FIG. 18, locking member 92 is coupled to the respective crank arm 54 or 56 by a spring 96. Thus, when the brake bar 20 is moved to its downward position and induces rotation in a respective shaft 30, shaft 30 will induce translation of the crank arm inwardly toward the central axis of the patient support, which will pull on spring 96, which in turn pulls on locking arm 92 so that it pivots about axis 93 and moves toward annular member 86. Further spring 96 applies a biasing force to urge locking member 92 toward annular member 86 so that the tab will extend into a respective notch 88 when aligned with a respective notch. Once engaged, interference between the locking bar tooth and the side walls of the respective notch, formed by the adjacent teeth 90, will prevent the respective bearing assembly from swiveling. Further, by providing generally parallel sides 88b, disengagement of the swivel lock can only be achieved by the linkage moving the locking arm from engagement with the annular member. When brake bar 20 is released, spring 60 will return cam assembly 50 to its unlocked position. In turn, spring 96 relaxes and is compressed by the respective crank arm (54, 56), which pivots locking arm out of its locked position.

Referring again to FIGS. 1-3, each end base member 34 and 36 and, further, longitudinal member 32 may be at least partially enclosed by a cover 14a. For example, cover 14a may comprise a monolithic plastic member that mounts over the respective components of the base or may be assembled from two or more covers, which are then secured together, to thereby protect a user of the braking system from contact with the majority of the moving parts of the braking system. Further, cover 14a facilitates cleaning of the patient support and also provides an aesthetic appearance to the base. Lift mechanisms 26 and 28 may also be covered by expandable or accordion-like covers 26a and 28a, respectively, which also similarly protect a user from the moving parts of the lift mechanism and, further, facilitate cleaning, as well as providing an aesthetic appearance to the patient support.

Accordingly, the present invention provides a braking system that provides enhanced access to braking system and, further, that may be configured to apply increased braking force to the various bearing assemblies of a patient support.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims, which follow as interpreted under the principles of patent law including the doctrine of equivalents.

The embodiments of the invention in which we claim an exclusive property right or privilege are defined as follows:

1. A movable patient support comprising:
    a frame having a foot end and a head end and a pair of longitudinal sides extending between said head end and said foot end, and said frame further having a frame footprint;
    a patient support surface supported at said frame;
    a base supporting said frame and having a plurality of bearing assemblies for moving said base along a floor surface, said bearing assemblies defining a bearing footprint;
    a brake supported for movement between a non-braking position and a braking position for braking at least one bearing assembly of said bearing assemblies;
    a brake actuator for actuating said brake of said at least one bearing assembly; and
    a brake bar coupled to said brake actuator and being movable between a non-braking position and a braking position where said actuator causes said brake to move to said braking position, and said brake bar having a longitudinal portion extending along a substantial portion of the length of said base and between said head end and said foot end, said longitudinal portion extending outwardly from said brake actuator to thereby provide a continuous foot engagable surface extending along a substantial portion of the length of the base to thereby provide relatively easy access to said brake bar to an attendant standing adjacent one of the longitudinal sides of said frame or near one of said ends of said frame.

2. The movable patient support according to claim 1, wherein said brake actuator includes a torsional shaft extending between said foot end and said head end.

3. The movable patient support according to claim 2, wherein said brake bar is coupled to said torsional shaft.

4. The movable patient support according to claim 3, wherein said brake actuator further includes a cam and a linkage coupled to said cam, said linkage being coupled to said torsional shaft, said torsional shaft having a longitudinal axis and being rotated about said longitudinal axis when said brake bar is moved to its braking position, and said rotation of said torsional shaft inducing movement of said linkage to cause said cam to actuate said brake.

5. The movable patient support according to claim 1, wherein said brake comprises a brake ring.

6. The movable patient support according to claim 1, said brake bar comprises a tubular member.

7. The movable patient support according to claim 1, wherein each of said bearing assemblies includes a mounting stem, said patient support further comprising an annular member mounted about one of said stems, and said patient support further comprising a locking arm coupled to said linkage, and said linkage moving said locking arm into engagement with said annular member to thereby arrest swiveling of said at least one bearing assembly when said brake bar is moved to its braking position.

8. The movable patient support according to claim 7, further comprising a spring urging said locking arm into engagement with said annular member when pivoted about said vertical axis toward said annular member.

9. The movable patient support according to claim 1, wherein said longitudinal portion is adjacent or within said bearing footprint.

10. The movable patient support according to claim 1, wherein said brake bar has a pair of connecting portions for connecting to said brake actuator adjacent said head end and adjacent said foot end, and said brake bar having an intermediate portion connecting said connecting portions, said intermediate portion forming said longitudinal portion and extending adjacent one of said longitudinal sides between said connecting portions and being offset inwardly from said one of said longitudinal sides toward said central longitudinal axis of said frame.

11. The movable patient support according to claim 1, wherein said base includes a head end base member and a foot end base member, said actuator extending between said head end base member and said foot end base member.

12. The movable patient support according to claim 11, said base further including a longitudinal member extending between said head end base member and said foot end base member, said longitudinal member, said head end base member, and said foot end base member forming a base frame, and said actuator being at least partially enclosed by said longitudinal member.

13. A movable patient support comprising:
    a frame having a foot end and a head end and a pair of longitudinal sides extending between said head end and said foot end, and said frame further having a frame footprint:
    a patient support surface supported at said frame;
    a base supporting said frame and having a plurality of bearing assemblies for moving said base along a floor surface, said bearing assemblies defining a bearing footprint;
    a brake supported for movement between a non-braking position and a braking position for braking at least one bearing assembly of said bearing assemblies:
    a brake actuator for actuating said brake of said at least one bearing assembly: and
    a brake bar coupled to said brake actuator and being movable between a non-braking position and a braking position where said actuator causes said brake to move to said braking position and said brake bar extending between said head end and said foot end and having a portion extending outwardly from said brake actuator within said frame footprint to thereby provide relatively easy access to said brake bar to an attendant standing adjacent one of the longitudinal sides of said frame each of said bearing assemblies including a mounting stem, said patient support further comprising an annular member mounted about one of said stems, and said patient support further comprising a locking arm coupled to said linkage, and said linkage moving said locking arm into engagement with said annular member to thereby arrest swiveling of said at least one bearing assembly when said brake bar is moved to its braking position, wherein said annular member includes a plurality of upwardly facing notches, said locking arm engaging said annular member at one of said notches to thereby arrest the swiveling of said at least one bearing assembly.

14. The movable patient support according to claim 13, wherein said locking arm is pivotally mounted relative to said frame about a vertical pivot axis, said linkage pivoting said locking arm about said vertical axis to thereby engage said annular member when said brake bar is moved to its braking position.

15. A movable patient support comprising:
    a frame;
    a patient support surface supported at said frame;
    a base supporting said frame and having a plurality of bearing assemblies for moving said base along a floor surface, said base including a head end base member, a foot end base member, and a longitudinal member extending between said head end base member and said foot end base member, said longitudinal member, said head end base member, and said foot end base member forming a base frame;

a brake supported for movement, between a non-braking position and a braking position for braking at least one bearing assembly of said bearing assemblies, each of said bearing assemblies having a mounting stem defining a swivel axis, said mounting stems mounting said brake assemblies to said base:

a brake actuator for actuating said brake, and said actuator being at least partially enclosed by said longitudinal member;

an annular member mounted about at least one stem of said stems of said bearing assemblies; and a locking arm pivotally mounted at said base and being coupled to said brake actuator, said locking arm being moveable between an unlocked position and a locking position and moving to said locking position where said locking arm is engageable with said annular member to thereby lock said at least one stem from swiveling about said swivel axis when said brake actuator actuates said brake.

16. The movable patient support according to claim 15, wherein said brake comprises a brake for braking each bearing assembly, and said brake actuator actuates at least two of said brakes.

17. A movable patient support comprising:
a frame:
a patient support surface supported at said frame:
a base supporting said frame and having a plurality of bearing assemblies for moving said base along a floor surface, said base including a head end base member, a foot end base member, and a longitudinal member extending between said head end base member and said foot end base member, said longitudinal member, said head end base member, and said foot end base member forming a base frame:

a brake supported for movement between a non-braking position and a braking position for braking at least one bearing assembly of said bearing assemblies, each of said bearing assemblies having a mounting stem defining a swivel axis, said mounting stems mounting said brake assemblies to said base:

a brake actuator for actuating said brake, and said actuator being at least partially enclosed by said longitudinal member:

an annular member mounted about at least one stem of said stems of said bearing assemblies: and a locking member pivotally mounted at said base and being coupled to said brake actuator, said locking arm being moveable between an unlocked position and a locking position and moving to said locking position where said locking arm is engageable with said annular member to thereby lock said at least one stem from swiveling about said swivel axis when said brake actuator actuates said brake, wherein said annular member includes a plurality of notches, said locking arm engaging said annular member at one of said notches to thereby arrest the swiveling of said at least one bearing assembly when said brake actuator actuates said brake.

18. The movable patient support according to claim 17, wherein said locking arm includes a tab, said tab sized to fit into said notches and provide an interference with said annular member at one of said notches.

19. The movable patient support according to claim 17, wherein said locking member pivots about a vertical axis when moved from its unlocked position to its locking position.

20. The movable patient support according to claim 19, further comprising a spring urging said locking arm into engagement with said annular member when pivoted about said vertical axis toward said annular member.

21. A movable patient support comprising:
a frame;
a patient support surface supported at said frame;
a base supporting said frame and having a plurality of bearing assemblies for moving the base along a floor surface, each of said bearing assemblies having a mounting stem defining a swivel axis, said mounting stems mounting said brake assemblies to said base;
a brake supported for movement between a non-braking position and a braking position for braking at least one bearing assembly of said bearing assemblies, said brake comprising an annular body extending around said swivel axis, and said annular body having a plurality of annularly spaced ridges having distal edges lying in spaced parallel planes, said ridges for engaging said at least one bearing assembly; and
a brake actuator for actuating said brake wherein when said brake actuator is actuated said annular body moves toward said at: least one bearing assembly and engages said bearing assembly with said ridges.

22. The movable patient support according to claim 21, further comprising a brake bar coupled to said brake actuator and being movable between a non-braking position and a braking position wherein said actuator causes said brake to move to its braking position when said brake bar moves to its braking position.

23. The movable patient support according to claim 22, wherein said frame includes a central longitudinal axis, and said brake bar being pivotable about an axis disposed parallel to said central longitudinal axis of the frame.

24. The movable patient support according to claim 23, wherein said frame includes a frame footprint, and said brake bar being within said frame footprint.

25. The movable support according to claim 24, wherein said bearing assemblies define a hearing footprint inward of said frame footprint, said brake bar being located either between said bearing footprint and said frame footprint or within said bearing footprint and said frame footprint.

26. The movable patient support according to claim 21, wherein said distal edges lie on an arc.

27. The movable patient support according to claim 26, wherein said at least one bearing assembly has a wheel with a radius of curvature about its axis of rotation, and said arc having a radius of curvature approximately equal to said radius of curvature of said wheel.

28. A movable patient support comprising:
a frame having a foot end and a head end and a pair of longitudinal sides extending between said head end and said foot end, and said frame further having a frame footprint:
a patient support surface supported at said frame;
a base supporting said frame and having a plurality of bearing assemblies for moving said base along a floor surface said bearing assemblies defining a bearing footprint:
a brake supported for movement between a non-braking position and a braking position for braking at least one bearing assembly of said bearing assemblies;

a brake actuator for actuating said brake of said at least one bearing assembly: and a brake bar coupled to said brake actuator and being movable between a non-braking position and a braking position where said actuator causes said brake to move to said braking position, and said brake bar extending between said head end and said foot end and having a portion extending outwardly from said brake actuator within said frame footprint to thereby provide relatively easy access to said brake bar to an attendant standing adjacent one of the longitudinal sides of said frame, wherein said brake comprises a brake ring, said brake ring including an annular member with a plurality of concentric ridges, said ridges facing said at least one bearing assembly.

* * * * *

UNITED STATES PATENT AND TRADEMARK OFFICE
CERTIFICATE OF CORRECTION

PATENT NO. : 8,196,237 B2
APPLICATION NO. : 12/470155
DATED : June 12, 2012
INVENTOR(S) : Cory Herbst et al.

It is certified that error appears in the above-identified patent and that said Letters Patent is hereby corrected as shown below:

| | |
|---|---|
| Claim 13, Col. 10, Line 22: | the ":" should be a ";" |
| Claim 13, Col. 10, Line 30: | the ":" should be a ";" |
| Claim 13, Col. 10, Line 32: | the ":" should be a ";" |
| Claim 15, Col. 11, Line 9: | the ":" should be a ";" |
| Claim 17, Col. 11, Line 29: | the ":" should be a ";" |
| Claim 17, Col. 11, Line 30: | the ":" should be a ";" |
| Claim 17, Col. 11, Line 39: | the ":" should be a ";" |
| Claim 17, Col. 11, Line 45: | the ":" should be a ";" |
| Claim 17, Col. 11, Line 48: | the ":" should be a ";" |
| Claim 17, Col. 11, Line 50: | the ":" should be a ";" |
| Claim 21, Col. 12, Line 28: | the ":" after the word "at" should be deleted |
| Claim 25, Col. 12, Line 44: | the word "hearing" should read "bearing" |
| Claim 28, Col. 12, Line 59: | the ":" should be a ";" |
| Claim 28, Col. 12, Line 64: | the ":" should be a ";" |
| Claim 28, Col. 13, Line 2: | the ":" should be a ";" |

Signed and Sealed this
Nineteenth Day of February, 2013

Teresa Stanek Rea
*Acting Director of the United States Patent and Trademark Office*